US009748607B2

(12) United States Patent
Woo

(10) Patent No.: US 9,748,607 B2
(45) Date of Patent: *Aug. 29, 2017

(54) ELECTROLYTE FOR LITHIUM BATTERY AND LITHIUM BATTERY INCLUDING THE ELECTROLYTE

(71) Applicant: Samsung SDI Co., Ltd., Yongin-si, Gyeonggi-do (KR)

(72) Inventor: Myungheui Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,466

(22) Filed: Mar. 8, 2016

(65) Prior Publication Data

US 2016/0268634 A1    Sep. 15, 2016

(30) Foreign Application Priority Data

Mar. 12, 2015   (KR) ......................... 10-2015-0034521

(51) Int. Cl.
| | | |
|---|---|---|
| H01M 10/0567 | (2010.01) | |
| H01M 10/0568 | (2010.01) | |
| H01M 4/525 | (2010.01) | |
| H01M 10/052 | (2010.01) | |

(52) U.S. Cl.
CPC ..... *H01M 10/0567* (2013.01); *H01M 10/052* (2013.01); *H01M 10/0568* (2013.01); *H01M 4/525* (2013.01); *H01M 2300/004* (2013.01)

(58) Field of Classification Search
CPC ........... H01M 10/052; H01M 10/0567; H01M 10/0568; H01M 10/0569; H01M 2300/0025; H01M 2300/0037; H01M 2300/004
See application file for complete search history.

(56) References Cited

U.S. PATENT DOCUMENTS

| | | | |
|---|---|---|---|
| 3,689,438 A | 9/1972 | Bourat et al. | |
| 4,064,167 A | 12/1977 | DuBois et al. | |
| 5,626,981 A | 5/1997 | Simon et al. | |
| 6,033,809 A | 3/2000 | Hamamoto et al. | |
| 6,291,107 B1 | 9/2001 | Shimizu | |
| 6,436,582 B1 | 8/2002 | Hamamoto et al. | |
| 6,506,516 B1 | 1/2003 | Wietelmann et al. | |
| 6,783,896 B2 * | 8/2004 | Tsujioka .................. | C07F 5/022 252/62.2 |
| 7,163,768 B2 | 1/2007 | Utsugi et al. | |
| 9,263,766 B2 * | 2/2016 | Makhmut ............. | H01M 4/587 |
| 2003/0180626 A1 | 9/2003 | Shima et al. | |
| 2004/0029004 A1 * | 2/2004 | Miyaki ................. | H01M 4/131 429/218.1 |
| 2004/0043300 A1 | 3/2004 | Utsugi et al. | |
| 2006/0134527 A1 | 6/2006 | Amine et al. | |
| 2009/0197167 A1 | 8/2009 | Okschimke | |
| 2010/0248041 A1 | 9/2010 | Kikuchi | |
| 2011/0183218 A1 | 7/2011 | Odani et al. | |
| 2012/0220785 A1 | 8/2012 | Bouteiller | |
| 2012/0231325 A1 | 9/2012 | Yoon et al. | |
| 2012/0258357 A1 | 10/2012 | Kim | |
| 2012/0288769 A1 | 11/2012 | Kono et al. | |
| 2013/0017455 A1 | 1/2013 | Deguchi et al. | |
| 2013/0171514 A1 | 7/2013 | Mio et al. | |
| 2014/0272604 A1 | 9/2014 | Lim et al. | |
| 2015/0010811 A1 | 1/2015 | Egorov et al. | |
| 2015/0086861 A1 | 3/2015 | Makhmut et al. | |
| 2016/0211550 A1 * | 7/2016 | Cha ................... | H01M 10/0567 |
| 2016/0268636 A1 | 9/2016 | Cha et al. | |

FOREIGN PATENT DOCUMENTS

| | | |
|---|---|---|
| EP | 2500975 A1 | 9/2012 |
| JP | 07-282845 | 10/1995 |
| JP | 2007-258103 | 10/2007 |
| KR | 10-0538901 B1 | 12/2005 |
| KR | 10-0692733 B1 | 3/2007 |
| KR | 10-0716373 B1 | 5/2007 |
| KR | 10-2012-0103519 A | 9/2012 |
| KR | 10-2013-0002333 A | 1/2013 |
| KR | 10-2013-0043221 A | 4/2013 |
| KR | 10-2013-0142387 A | 12/2013 |
| KR | 10-2014-0104383 A | 8/2014 |
| KR | 10-2015-0033445 A | 4/2015 |

OTHER PUBLICATIONS

Abstract and Machine English Translation of Korean Patent No. 10-0692733 B1, Mar. 12, 2007, 17 Pages.
EPO Search Report dated Feb. 5, 2015, for corresponding European Patent application 14177532.0, (7 pages).
Patent Abstracts of Japan, and English machine translation of Japanese Publication 07-282845 dated Oct. 27, 1995, listed above, (13 pages).
Patent Abstracts of Japan, and English machine translation of Japanese Publication 2007-258103 dated Oct. 4, 1997, listed above, (38 pages).
Goethals, E., et al., The Disultone of 2.2-Dihydroxymethy1-1.3-Propane Disulphonic Acid, Bull. Soc. Chim. Belg., 70, 1961, pp. 218-220.

(Continued)

*Primary Examiner* — Anca Eoff
(74) *Attorney, Agent, or Firm* — Lewis Roca Rothgerber Christie LLP

(57) ABSTRACT

Provided are an electrolyte for a lithium battery and a lithium battery including the electrolyte, wherein the electrolyte includes a disultone-based compound represented by Formula 1; an oxalate-based compound; and an organic solvent:

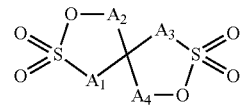

Formula 1 wherein, in Formula 1, $A_1$, $A_2$, $A_3$, and $A_4$ are each independently a substituent-substituted or unsubstituted $C_1$-$C_5$ alkylene group; a carbonyl group; or a sulfinyl group.

13 Claims, 5 Drawing Sheets

(56) References Cited

OTHER PUBLICATIONS

Peled, E., The Electrochemical Behavior of Alkali and Alkaline Earth Metals in Nonaqueous Battery Systems-The Solid Electrolyte Interphase Model, Journal of Electrochemical Society, Electrochemical Science and Technology, 126, 1979, pp. 2047-2051.

Xu, K., et al., Interfacing Electrolytes with Electrodes in Li Ion Batteries, Journal of Materials Chemistry, vol. 21, Feb. 7, 2011, pp. 9849-9864.

2,7-dioxa-3, 8-dithiaspiro [4.4] nonane 3, 3, 8, 8-tetraoxide-Compound summary, http://pubchem.ncbi.nlm.nih.gov/summary/summary.cgi?cid=248367.

U.S. Office Action dated Jun. 25, 2015, issued in cross-reference U.S. Appl. No. 14/151,750 (8 pages).

U.S. Notice of Allowance dated Oct. 6, 2015, issued in cross-reference U.S. Appl. No. 14/151,750 (5 pages).

U.S. Office Action dated Dec. 21, 2016, issued in cross-reference U.S. Appl. No. 15/068,054 (16 pages).

U.S. Office Action dated Dec. 22, 2016, issued in cross-reference U.S. Appl. No. 14/788,414 (11 pages).

\* cited by examiner

ELECTROLYTE FOR LITHIUM BATTERY AND LITHIUM BATTERY INCLUDING THE ELECTROLYTE

CROSS-REFERENCE TO RELATED APPLICATION

This application claims priority to and the benefit of Korean Patent Application No. 10-2015-0034521, filed on Mar. 12, 2015, in the Korean Intellectual Property Office, the entire content of which is incorporated herein by reference.

BACKGROUND

1. Field

One or more example embodiments relate to an electrolyte for a lithium battery and a lithium battery including the electrolyte.

2. Description of the Related Art

Lithium batteries are used as power sources for portable electronic devices such as video cameras, cell phones, and laptop computers. Rechargeable lithium secondary batteries have an energy density per unit weight that is about 3 times higher than that of conventional lead storage batteries, nickel-cadmium batteries, nickel-hydride batteries, nickel-zinc batteries, or the like, and may be rapidly charged.

Lithium batteries operate at a high driving voltage, and thus, an aqueous-based electrolyte solution that is highly reactive with lithium should not be used in the lithium batteries. Generally, a lithium battery uses an organic electrolyte. The organic electrolyte is prepared by dissolving a lithium salt in an organic solvent. An example of an organic solvent (e.g., a preferable organic solvent) is one that is stable at a high voltage, has high ion conductivity and permittivity, and has a low viscosity.

As an example of the lithium salt, $LiPF_6$ is mainly used. However, a reaction between $LiPF_6$ and the organic solvent of the organic electrolyte causes depletion of the organic electrolyte and produces a large amount of gas. When a carbonate-based non-aqueous polar solvent is used as the organic solvent, a lithium battery undergoes an irreversible reaction using an excessive amount of charge during charging/discharging of the battery, due to a side reaction between an electrolytic solution and a negative electrode/positive electrode. A passivation layer, such as a solid electrolyte interface (SEI) layer, is formed on a surface of a negative electrode by the irreversible reaction. The SEI layer reduces or prevents decomposition of an electrolytic solution and serves as an ion tunnel during charging/discharging of the lithium battery. When the SEI layer has high stability and low resistance, lifespan of the lithium battery may be improved.

In regard to stabilization of the SEI layer, various types or kinds of additives are used. However, a conventional SEI layer formed by using an additive is easily deteriorated at a high temperature, and thus, the stability of the conventional SEI layers is reduced at a high temperature.

SUMMARY

One or more example embodiments include a novel electrolyte for a lithium battery.

One or more example embodiments include a lithium battery including the electrolyte.

Additional aspects of embodiments will be set forth in part in the description which follows and, in part, will be apparent from the description, or may be learned by practice of the presented embodiments.

According to one or more example embodiments, an electrolyte for a lithium battery includes a disultone-based compound represented by Formula 1 below; an oxalate-based compound including at least one selected from a compound represented by Formula 2 below and a compound represented by Formula 3 below; and an organic solvent:

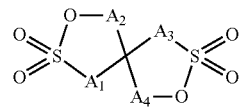

Formula 1

In Formula 1, $A_1$, $A_2$, $A_3$, and $A_4$ are each independently a $C_1$-$C_5$ alkylene group substituted or unsubstituted with a substituent; a carbonyl group; or a sulfinyl group, and

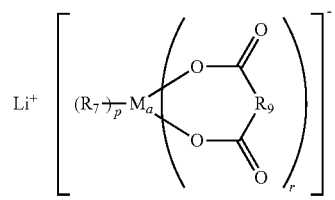

Formula 2

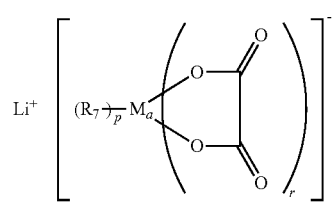

Formula 3 in Formulae 2 and 3, $M_a$ is aluminum (Al), boron (B), or phosphorus (P), p is an integer selected from 0 to 8, and r is an integer selected from 1 to 4, $R_7$ is a halogen, and $R_9$ is an unsubstituted $C_1$-$C_5$ alkylene group or a $C_1$-$C_5$ alkylene group substituted with a halogen.

According to one or more example embodiments, a lithium battery includes a positive electrode; a negative electrode; and the electrolyte described above.

BRIEF DESCRIPTION OF THE DRAWINGS

These and/or other aspects of embodiments of the present disclosure will become apparent and more readily appreciated from the following description of the example embodiments when considered with reference to the accompanying drawings in which.

DETAILED DESCRIPTION

Figure 1:
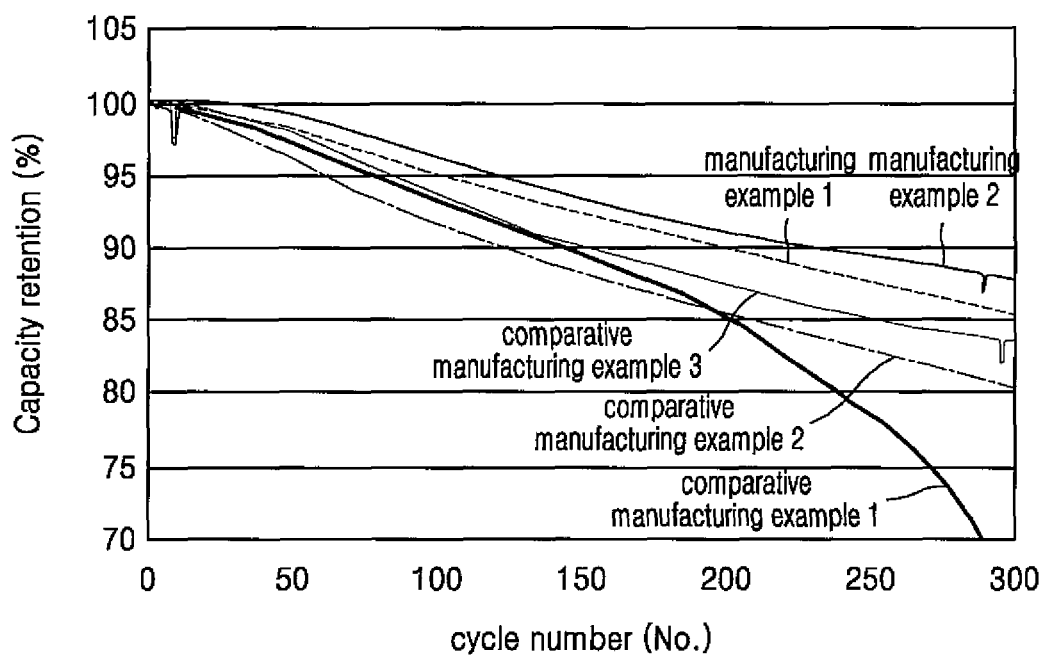
FIG. 1 is a graph showing lifespan characteristics of lithium batteries prepared according to Manufacturing Examples 1 and 2 and Comparative Manufacturing Examples 1 to 3 at room temperature.

Reference will now be made in more detail to example embodiments, examples of which are illustrated in the accompanying drawings, wherein like reference numerals refer to like elements throughout. In this regard, the present example embodiments may be embodied in many different forms and should not be construed as being limited to the descriptions set forth herein. Accordingly, the example embodiments are merely described below, by referring to the drawings, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list. Also, in the context of the present application, when a first element is referred to as being "on" a second element, it can be directly on the second element or be indirectly on the second element with one or more intervening elements interposed therebetween.

Hereinafter, according to example embodiments, an electrolyte for a lithium battery and a lithium battery including the electrolyte will be described in detail.

An electrolyte for a lithium secondary battery according to an example embodiment may include a disultone-based compound represented by Formula 1 below; an oxalate-based compound that is at least one selected from a compound represented by Formula 2 below and a compound represented by Formula 3 below; and an organic solvent:

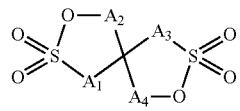

Formula 1

In Formula 1, $A_1$, $A_2$, $A_3$, and $A_4$ may be each independently a substituted or unsubstituted $C_1$-$C_5$ alkylene group (e.g., a $C_1$-$C_5$ alkylene group substituted or unsubstituted with a substituent), a carbonyl group, or a sulfinyl group.

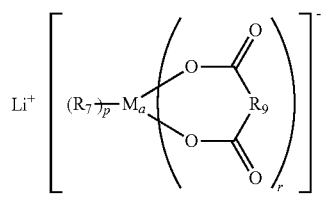

Formula 2

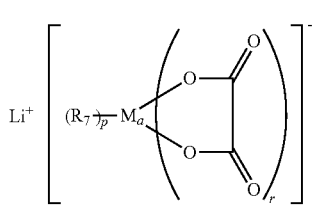

Formula 3

In Formulae 2 and 3, $M_a$ may be aluminum (Al), boron (B), or phosphorus (P), p may be an integer selected from 0 to 8, r may be an integer selected from 1 to 4, $R_7$ may be a halogen, and $R_9$ may be an unsubstituted $C_1$-$C_5$ alkylene group or a substituted $C_1$-$C_5$ alkylene group with a halogen (a $C_1$-$C_5$ alkylene group substituted with a halogen).

The halogen may be, for example, fluorine (F), chlorine (Cl), iodine (I), or the like, and the alkylene group may be, for example, methylene, ethylene, propylene, butylene, or the like, but the present disclosure is not limited thereto.

The oxalate-based compound may include at least one selected from compounds each represented by Formulae 4 to 9 below:

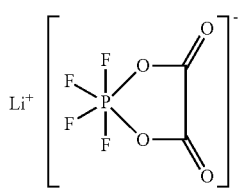

Formula 4

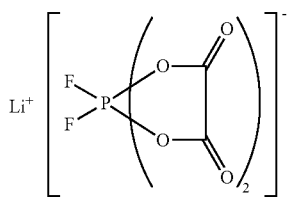

Formula 5

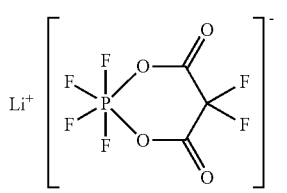

Formula 6

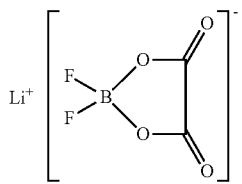

Formula 7

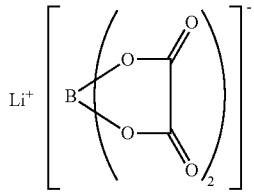

Formula 8

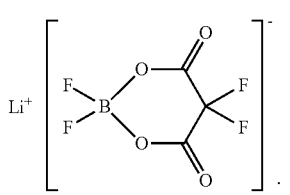

Formula 9

In an example embodiment, the oxalate-based compound may include a compound represented by Formula 5, lithium difluoro(oxalato)borate (LiFOB) represented by Formula 7, or lithium bis(oxalato)borate (LiBOB) represented by Formula 8. Such an oxalate-based compound and a disultone-based compound are added into an electrolytic solution for a lithium battery, and accordingly, direct current internal resistances (DC-IRs) and gas generation amounts in the lithium battery are reduced, thereby improving lifespan characteristics and performance of the lithium battery.

An amount of oxalate-based compound contained in the electrolyte may be in a range of about 0.5 to about 3 weight %, for example about 0.5 wt % to about 1.5 wt % based on the total weight of the electrolyte. When the amount of the oxalate-based compound is within this range, the lifespan characteristics of the lithium battery may be improved without increasing or substantially increasing the DC-IRs in the electrolyte.

Any suitable lithium salt generally available in the art to prepare an electrolyte may be used. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently an integer selected from 1 to 20), LiCl, LiI, or a mixture thereof. Here, a concentration of such a typical lithium salt may be in a range of about 0.01 to about 2.00 M, but embodiments of the electrolyte are not limited thereto, and a suitable concentration of the lithium salt may be used as desired or needed. When the concentration of the lithium salt is within this range, the lithium battery may have further improved characteristics. The electrolyte according to embodiments of the present disclosure is capable of forming an SEI layer that reduces or inhibits a side reaction with the lithium salt (e.g., $LiPF_6$) and has improved stability at a high temperature.

The electrolyte may be in a liquid state or a gel state (e.g., the electrolyte may be a liquid or a gel). The electrolyte may be prepared by adding the lithium salt and the additives, e.g., the disultone-based compound and the oxalate-based compound, to the organic solvent.

In the electrolyte, an amount of the additive, e.g., the disultone-based compound of Formula 1, may be in a range of 0.01 to about 10 weight %, for example, about 0.5 to about 3 weight %, based on the total weight of the electrolyte, but the electrolyte is not limited thereto, and a suitable amount of the disultone-based compound may be used as desired or needed.

In the electrolyte, an amount of the organic solvent may be in a range of 87 to about 99.7 weight %, based on the total weight of the electrolyte.

In the electrolyte, the disultone-based compound may have a melting point of at least 115° C. (e.g., a melting point in a range of about 115° C. to about 300° C.). For example, the disultone-based compound may have a melting point of at least 120° C. or a melting point in a range of about 120° C. to about 300° C. For example, the disultone-based compound may have a melting point in a range of about 130° C. to about 300° C., for example, about 140° C. to about 300° C. When the disultone-based compound has a melting point of 115° C. or more (e.g., at least 115° C.), the lithium battery may have improved stability at a high temperature.

The disultone-based compound may have a structure in which two sultone rings are linked with each other (e.g., fused together) in a spiro form (e.g., the disultone-based compound may include a spiro compound).

In an example embodiment, the oxalate-based compound including at least one selected from the compound of Formula 5, LiFOB of Formula 7, and LiBOB of Formula 8, and the disultone-based compound may be mixed at or to a mixing weight ratio in a range of about 1:0.5 to about 1:3.

Without being bound by any particular theory, it is believed that the reasons why the lithium battery performance improves when the oxalate-based compound including at least one selected from LIFOB and LiBOB and the disultone-based compound are added are as follows.

When the oxalate-based compound including at least one selected from LiFOB and LiBOB is added to the electrolyte, the SEI layer, which is a porous, thin, and inorganic film, is formed on a surface of a negative electrode to prevent an additional reduction reaction in the electrolyte (or to reduce a likelihood or extent of the additional reduction reaction), whereas a carboxylate-based SEI layer is formed on a surface of a positive electrode to reduce or prevent oxidation of the electrolytic solution, which reduces or suppresses metal dissolution, and reduces or inhibits gas production, thereby obtaining the lithium battery having improved lifespan characteristics after being preserved (as used herein, the term "preserved" may be synonymous with the term stored or maintained) at a high temperature, the lifespan characteristics being associated with a low temperature, and output characteristics. For example, the SEI layer formed from the oxalate-based compound on the negative electrode reduces a reduction reaction in the electrolyte, while the SEI layer formed from a carboxylate-based on the positive electrode reduces an oxidation reaction in the electrolyte. In addition, a sulfonate ester group included in the disultone-based compound is reduced by accepting electrons from a surface of the negative electrode during a charging process or may affect a property of the SEI layer formed on the surface of the negative electrode by reacting with a polar solvent molecule that is already reduced. For example, the disultone-based compound including the sulfonate ester group may accept electrons from the negative electrode more easily than the polar solvent. In some embodiments, the disultone-based compound is reduced at a voltage lower than that of the polar solvent, and thus, may be reduced before the polar solvent is reduced.

For example, the disultone-based compound may be further easily reduced and/or decomposed to radicals and/or ions during a charging process by including the sulfonate ester group. Therefore, in some embodiments, the radicals and/or ions bind with lithium ions to form an SEI layer suitable for the negative electrode, and thus, may reduce or suppress formation of additional decomposition products of the solvent. In some embodiments, the radicals and/or ions formed from the disultone-based compound form an SEI layer in addition to or in combination with the SEI layer formed from the oxalate-based compound. For example, the disultone-based compound may form a covalent bond with various suitable functional groups of a carbon-based negative electrode existing on a surface of a carbon-based negative electrode or may be adsorbed on a surface of an electrode. A modified SEI layer having improved stability that maintains its firm state after charging/discharging for a longer period of time, and the stability of the modified SEI layer may be better than that of the SEI layer formed by only using an organic solvent and a lithium salt by such binding and/or adsorption. Also, the firm modified SEI layer may further effectively block the organic solvent prepared by solventing lithium ions during intercalation/deintercalation of the lithium ions and/or of plating/stripping the lithium ions from entering into the electrode (e.g., an SEI layer formed on the negative electrode from the disultone-based compound may reduce an amount of organic solvent entering the negative electrode). Therefore, the modified SEI layer further effectively reduces or blocks direct contact between the organic solvent and the negative electrode, and thus, reversibility of intercalation/deintercalation of lithium ions is further improved, and, ultimately, lifespan characteristics of the battery may be improved.

Also, the disultone-based compound may be coordinated on a surface of the positive electrode by including the sulfonate ester group, and thus, may affect a property of the protection layer (e.g., an SEI layer) formed on the surface of the positive electrode. For example, the sulfonate ester group may be coordinated on or to a transition metal ion of the positive electrode active material, and thus, may form a complex. Due to the complex, the modified protection layer having improved stability may maintain a firm state after a long period of charging/discharging as compared to that of the protection layer formed by only using an organic solvent (e.g., an organic solvent that does not include the disultone-based compound or the sulfonate ester group). Also, the firm modified protection layer may further effectively block the organic solvent prepared by solventing lithium ions during intercalation of the lithium ions from entering into the electrode (e.g., a protection layer or SEI layer formed on the positive electrode from the disultone-based compound may reduce an amount of organic solvent entering the positive electrode). The modified protection layer further effectively reduces or blocks direct contact between the organic solvent and the positive electrode, and thus, reversibility of intercalation/deintercalation of lithium ions is further improved, and, ultimately, lifespan characteristics of the battery may be improved.

Furthermore, since the disultone-based compound has a plurality of rings that are linked in a spiro form, a molecular weight of the disultone-based compound may be relatively higher than that of other sultone-based compounds (e.g., a general sultone-based compound), and thus, the disultone-based compound (e.g., a disultone-based spiro compound) may have improved thermally stability.

Accordingly, the disultone-based compound may form the SEI layer on the surface of the negative electrode and/or may form the protection layer on the surface of the positive electrode, and a high stability of the lithium battery may improve by having improved thermal stability.

In the disultone-based compound of Formula 1, the substituent of the alkylene group may be a halogen-substituted or unsubstituted $C_1$-$C_{20}$ alkyl group; a halogen-substituted or unsubstituted $C_2$-$C_{20}$ alkenyl group; a halogen-substituted or unsubstituted $C_2$-$C_{20}$ alkynyl group; a halogen-substituted or unsubstituted $C_3$-$C_{20}$ cycloalkenyl group; a halogen-substituted or unsubstituted $C_3$-$C_{20}$ heterocycloalkenyl group; a halogen-substituted or unsubstituted $C_6$-$C_{40}$ aryl group; a halogen-substituted or unsubstituted $C_2$-$C_{40}$ heteroaryl group; or a polar functional group including a heteroatom.

Examples of the substituent of the alkylene group may include a halogen, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group, but the example embodiments are not limited thereto, and any substituent suitable as a substituent of an alkylene group available in the art may be used.

For example, the substituent of the alkylene group in the disultone-based compound of Formula 1 may be a polar functional group including a heteroatom, and the heteroatom of the polar functional group may include at least one selected from the group consisting of oxygen, nitrogen, phosphorus, sulfur, silicon, and boron.

For example, the polar functional group including the heteroatom may include at least one selected from the group consisting of —F, —Cl, —Br, —I, —C(=O)OR$^{16}$, —OC(=O)R$^{16}$, —OR$^{16}$, —OC(=O)OR$^{16}$, —R$^{15}$OC(=O)OR$^{16}$, —C(=O)R$^{16}$, —R$^{15}$C(=O)R$^{16}$, —OC(=O)R$^{16}$, —R$^{15}$OC(=O)R$^{16}$, —(R$^{15}$O)$_k$—OR$^{16}$, —(OR$^{15}$)$_k$—OR$^{16}$, —C(=O)—O—C(=O)R$^{16}$, —R$^{15}$C(=O)—O—C(=O)R$^{16}$, —SR$^{16}$, —R$^{15}$SR$^{16}$, —SSR$^{16}$, —R$^{15}$SSR$^{16}$, —S(=O)R$^{16}$, —R$^{15}$S(=O)R$^{16}$, —R$^{15}$C(=S)R$^{16}$, —R$^{15}$C(=S)SR$^{16}$, —R$^{15}$SO$_3$R$^{16}$, —SO$_3$R$^{16}$, —NNC(=S)R$^{16}$, —R$^{15}$NNC(=S)R$^{16}$, —R$^{15}$N=C=S, —NCO, —R$^{15}$—NCO, —NO$_2$, —R$^{15}$NO$_2$, —R$^{15}$SO$_2$R$^{16}$, —SO$_2$R$^{16}$,

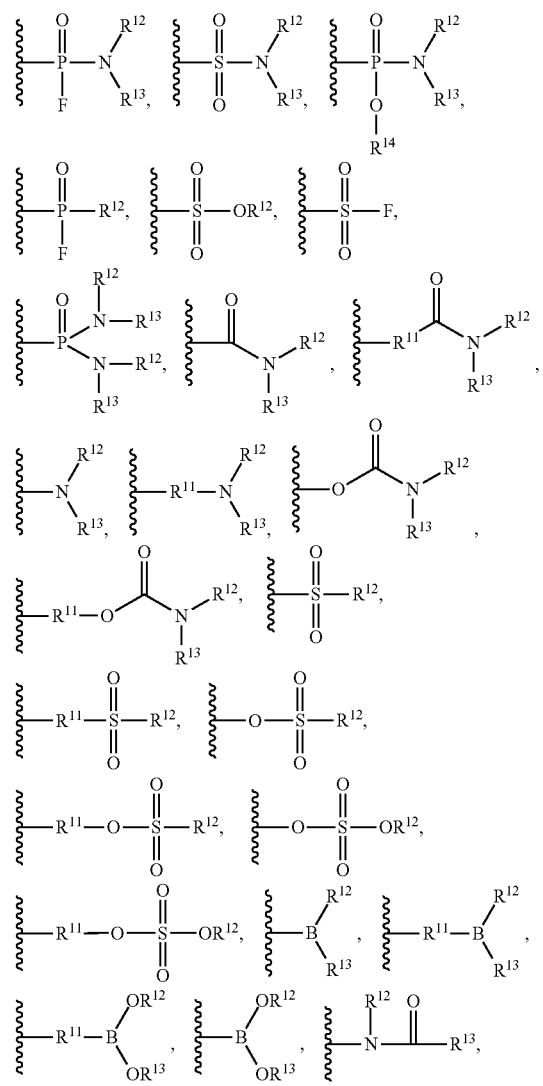

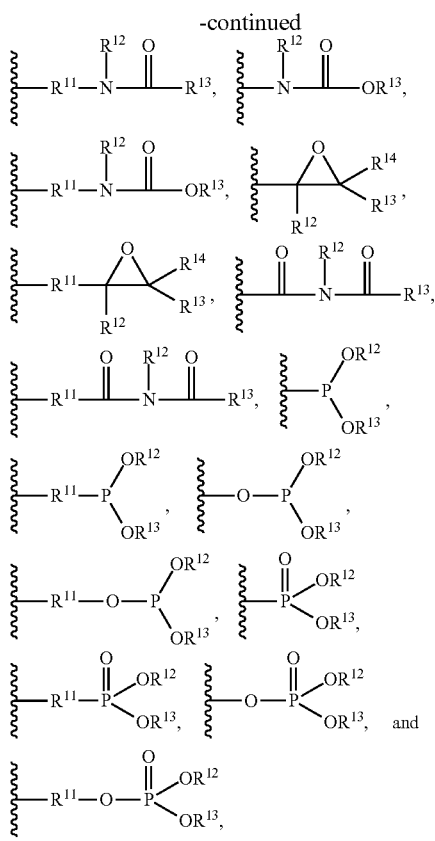

wherein $R^{11}$ and $R^{15}$ may be each independently a halogen-substituted or unsubstituted $C_1$-$C_{20}$ alkylene group; a halogen-substituted or unsubstituted $C_2$-$C_{20}$ alkenylene group; a halogen-substituted or unsubstituted $C_2$-$C_{20}$ alkynylene group; a halogen-substituted or unsubstituted $C_3$-$C_{12}$ cycloalkylene group; a halogen-substituted or unsubstituted $C_6$-$C_{40}$ arylene group; a halogen-substituted or unsubstituted $C_2$-$C_{40}$ heteroarylene group; or a halogen-substituted or unsubstituted $C_7$-$C_{15}$ alkylarylene group; or a halogen-substituted or unsubstituted $C_7$-$C_{15}$ aralkylene group, $R^{12}$, $R^{13}$, $R^{14}$, and $R^{16}$ may be each independently a hydrogen atom; a halogen atom; a halogen-substituted or unsubstituted $C_1$-$C_{20}$ alkyl group; a halogen-substituted or unsubstituted $C_2$-$C_{20}$ alkenyl group; a halogen-substituted or unsubstituted $C_2$-$C_{20}$ alkynyl group; a halogen-substituted or unsubstituted $C_3$-$C_{12}$ cycloalkyl group; a halogen-substituted or unsubstituted $C_6$-$C_{40}$ aryl group; a halogen-substituted or unsubstituted $C_2$-$C_{40}$ heteroaryl group; a halogen-substituted or unsubstituted $C_7$-$C_{15}$ alkylaryl group; a halogen-substituted or unsubstituted $C_7$-$C_{15}$ trialkylsilyl group; or a halogen-substituted or unsubstituted $C_7$-$C_{15}$ aralkyl group, and k may be an integer selected from 1 to 20.

For example, the halogen substituent of the alkyl group, the alkenyl group, the alkynyl group, the cycloalkyl group, the aryl group, the heteroaryl group, the alkylaryl group, the trialkylsilyl group, or the aralkyl group included in the polar functional group including a heteroatom may be a fluorine atom.

For example, the disultone-based compound may be represented one of by Formulae 10 or 11 below:

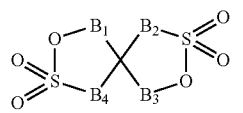

Formula 10

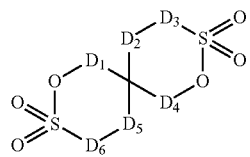

Formula 11

In Formulae 10 and 11, $B_1$, $B_2$, $B_3$, $B_4$, $D_1$, $D_2$, $D_3$, $D_4$, $D_5$, and $D_6$ may be each independently —$C(E_1)(E_2)$—; a carbonyl group (—C(=O)—); or a sulfinyl group (—S(=O)—), and $E_1$ and $E_2$ may be each independently a hydrogen atom; a halogen atom; a halogen-substituted or unsubstituted $C_1$-$C_{20}$ alkyl group; a halogen-substituted or unsubstituted $C_2$-$C_{20}$ alkenyl group; a halogen-substituted or unsubstituted $C_2$-$C_{20}$ alkynyl group; a halogen-substituted or unsubstituted $C_3$-$C_{20}$ cycloalkenyl group; a halogen-substituted or unsubstituted $C_3$-$C_{20}$ heterocycloaryl group; a halogen-substituted or unsubstituted $C_6$-$C_{40}$ aryl group; or a halogen-substituted or unsubstituted $C_2$-$C_{40}$ heteroaryl group.

For example, $E_1$ and $E_2$ in Formulae 10 and 11 may be each independently a hydrogen atom; a halogen atom; a halogen-substituted or unsubstituted $C_1$-$C_{10}$ alkyl group; a halogen-substituted or unsubstituted $C_6$-$C_{40}$ aryl group; or a halogen-substituted or unsubstituted $C_2$-$C_{40}$ heteroaryl group.

For example, $E_1$ and $E_2$ in Formulae 10 and 11 may be each independently a hydrogen atom, a fluorine atom, a chlorine atom, a bromine atom, an iodine atom, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, or a pyridinyl group.

For example, $E_1$ and $E_2$ in Formulae 10 and 11 may be each independently a hydrogen atom, a fluorine atom, a methyl group, an ethyl group, a trifluoromethyl group, a tetrafluoroethyl group, or a phenyl group.

For example, the disultone-based compound may be represented by one of Formulae 12 or 13 below:

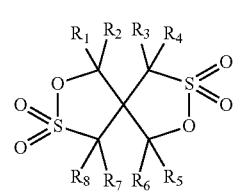

Formula 12

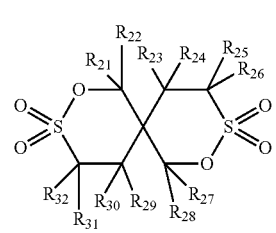

Formula 13

In Formulae 12 and 13, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ may be each independently a hydrogen atom; a halogen atom; a halogen-substituted or unsubstituted $C_1$-$C_{20}$ alkyl group; a halogen-substituted or unsubstituted $C_6$-$C_{40}$ aryl group; or a halogen-substituted or unsubstituted $C_2$-$C_{40}$ heteroaryl group.

For example, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ in Formula 12 and 13 may be each independently a hydrogen atom, a fluorine atom, a chlorine atom, a bromine atom, an iodine atom, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrole group, or a pyridine group.

For example, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ in Formula 12 and 13 may be each independently a hydrogen atom, a fluorine atom, a methyl group, an ethyl group, a propyl group, a trifluoromethyl group, a tetrafluoroethyl group, or a phenyl group.

For example, the disultone-based compound may be represented by one of Formulae 14 to 25 below:

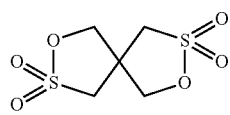

Formula 14

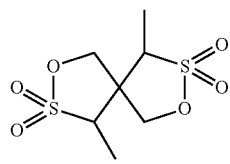

Formula 15

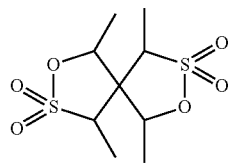

Formula 16

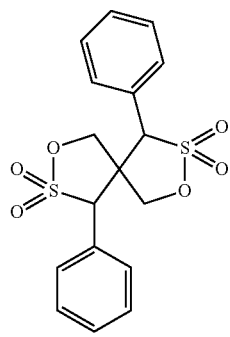

Formula 17

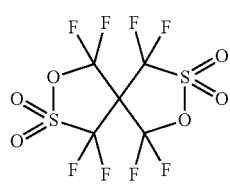

Formula 18

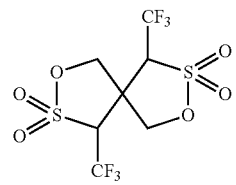

Formula 19

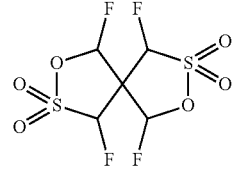

Formula 20

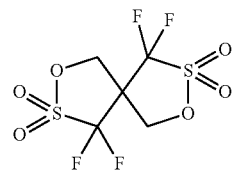

Formula 21

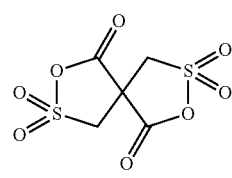

Formula 22

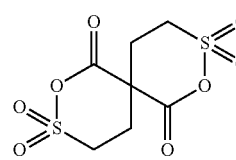

Formula 23

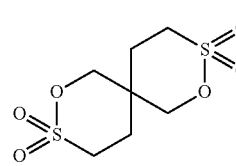

Formula 24

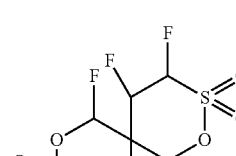

Formula 25

In the expressions "$C_a$-$C_b$," as used herein, "a" and "b" are integers referring to the number of carbon atoms in a particular group. For example, the group may contain from "a" to "b", inclusive, carbon atoms. For example, a "$C_1$-$C_4$ alkyl group" refers to an alkyl group containing from 1 to 4 carbon atoms, and examples thereof include $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

It is to be understood that certain radical naming conventions used herein may include either a mono-radical or a di-radical, depending on the context. For example, when a substituent requires two points of attachment to the rest of the molecule, it is understood that the substituent is a di-radical. For example, a substituent identified as an alkyl group that requires two points of attachment includes di-radicals, such as —CH$_2$—, —CH$_2$CH$_2$—, and —CH$_2$CH(CH$_3$)CH$_2$—. Other radical naming conventions used herein clearly indicate that the radical is a di-radical, such as "alkylene".

The term "alkyl group" or "alkylene group," as used herein, refers to a branched or non-branched aliphatic hydrocarbon group. In an example embodiment, the alkyl group may be substituted or may not be substituted with a substituent (e.g. the alkyl group may be unsubstituted). Examples of the alkyl group include a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, a cycloheptyl group, and the like, but the alkyl group is not limited thereto. Each of the examples of the alkyl group may be optionally substituted or not substituted with a substituent (e.g., may be unsubstituted). In an example embodiment, the alkyl group may have 1 to 6 carbon atoms. Examples of the C$_1$-C$_6$ alkyl group include methyl, ethyl, propyl, isopropyl, butyl, isobutyl, sec-butyl, pentyl, 3-pentyl, hexyl, and the like, but the C$_1$-C$_6$ alkyl group is not limited thereto.

The term "cycloalkyl group," as used herein, refers to a carbocyclic ring or ring system that is fully saturated. Examples of the cycloalkyl group include cyclopropyl, cyclobutyl, cyclopentyl, cyclohexyl, and the like.

The term "alkenyl group," as used herein, refers to a hydrocarbon having 2 to 20 carbon atoms and at least one carbon-carbon double bond. Examples of the alkenyl group include an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, a cycloheptenyl group, and the like, but the alkenyl group is not limited thereto. In an example embodiment, the alkenyl group may be substituted or may not be substituted with a substituent (e.g., may be unsubstituted). In an example embodiment, the alkenyl group may have 2 to 40 carbon atoms.

The term "alkynyl group," as used herein, refers to a hydrocarbon having 2 to 20 carbon atoms and including at least one carbon-carbon triple bond. Examples of the alkynyl group include an ethynyl group, a 1-propynyl group, a 1-butynyl group, a 2-butynyl group, and the like, but the alkynyl group is not limited thereto. In an example embodiment, the alkynyl group may be substituted or may not be substituted with a substituent (e.g., may be unsubstituted). In an example embodiment, the alkynyl group may have 2 to 40 carbon atoms.

The term "aryl group," as used herein, refers to an aromatic ring or ring system (e.g., at least two fused rings sharing two adjacent carbon atoms) containing only carbon atoms in the ring backbone. When the aryl group is a ring system, every ring in the system is aromatic. Examples of the aryl group include a phenyl group, a biphenyl group, a naphthyl group, a phenanthrenyl group, a naphthacenyl group, and the like, but the aryl group is not limited thereto. The aryl group may be substituted or may not be substituted with a substituent (e.g., may be unsubstituted).

The term "heteroaryl group," as used herein, refers to an aromatic ring system having either one ring or a plurality of rings that are fused to each other, wherein at least one ring atom is not a carbon atom, but a heteroatom. In terms of a fused ring system, at least one heteroatom may be contained only in one ring. For example, the heteroatom may include oxygen, sulfur, or nitrogen, but the heteroatom is not limited thereto. Examples of the heteroaryl group include a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, an indolyl group, and the like, but the heteroaryl group is not limited thereto.

The terms "aralkyl group" and "alkylaryl group," as used herein, refer to an aryl group coupled or connected, as a substituent, via an alkylene group, and examples thereof include a C$_7$-C$_{14}$ aralkyl group, a benzyl group, a 2-phenylethyl group, a 3-phenylpropyl group, a naphthylalkyl group, and the like, but the aralkyl and alkylaryl groups are not limited thereto. In an example embodiment, the alkylene group is a lower alkylene group (e.g., a C$_1$-C$_4$ alkylene group).

The term "cycloalkenyl group," as used herein, refers to a carbocyclic ring or ring system having at least one double bond, wherein no ring in the ring system is aromatic. An example thereof is a cyclohexenyl group.

The term "heterocyclo group," as used herein, refers to a non-aromatic ring or ring system having at least one heteroatom in a ring backbone.

The term "halogen," as used herein, refers to a stable atom of column 17 of the Periodic Table of the Elements, e.g., fluorine, chlorine, bromine, or iodine, with fluorine and chlorine being preferred.

In the present disclosure, a substituted group is derived from an unsubstituted mother group in which there has been an exchange of at least one hydrogen for another atom or group. Unless otherwise indicated, when a group is deemed to be "substituted", it is meant that the group is substituted with at least one substituent selected from a C$_1$-C$_{40}$ alkyl group, a C$_2$-C$_{40}$ alkenyl group, a C$_3$-C$_{40}$ cycloalkenyl group, a C$_1$-C$_{40}$ alkyl group, and a C$_7$-C$_{40}$ aryl group. In the case of describing a group being "optionally substituted", it is meant that the group may be substituted with the substituents described above.

In the electrolyte, the organic solvent may include a solvent having a low boiling point. In some embodiments, the solvent having a low boiling point refers to a solvent of which a boiling point is 200° C. or less under conditions of a temperature of 25° C. and a pressure of 1 atm.

For example, the organic solvent may include at least one selected from a dialkylcarbonate, ring=type carbonate (e.g., a ring kind of carbonate), linear or ring-type ester (e.g., a ring kind of ester), linear or ring-type amide (e.g., a ring kind of amide), aliphatic nitrile, linear or ring-type ether (e.g., a ring kind of ether), and derivatives thereof.

For example, the organic solvent may include at least one selected from dimethyl carbonate (DMC), ethylmethyl carbonate (EMC), methylpropyl carbonate, ethylpropyl carbonate, diethyl carbonate (DEC), dipropyl carbonate, propylene carbonate (PC), ethylene carbonate (EC), fluoroethylene carbonate (FEC), butylene carbonate, ethylpropionate, ethylbutyrate, acetonitrile, succinonitrile (SN), dimethylsulfoxide, dimethylformamide, dimethylacetamide, gamma-valerolactone, gamma-butyrolactone, and tetrahydrofuran, but the example embodiments are not limited thereto. Any suitable solvent having a low boiling point available in the art may be used.

In another example embodiment, the lithium battery includes a positive electrode; a negative electrode, and the electrolyte. A type or kind of the lithium battery is not particularly limited, and may include a lithium secondary battery, such as a lithium ion battery, a lithium ion polymer battery, and a lithium sulfur battery, in addition to a lithium primary battery.

In the lithium battery, the positive electrode may include a nickel-rich lithium nickel composite oxide, wherein an amount of nickel is in a range of about 20 to about 90 weight %, e.g., about 30 to about 80 weight %, based on the total weight of a transition metal (e.g., based on the total weight of transition metals included in the nickel-rich lithium nickel composite oxide). In regard to the nickel-rich lithium nickel composite oxide for improved performance at a high temperature, addition of the oxalate-based compound and the disultone-based compound to the electrolyte may not only reduce the increase in resistance at a high temperature, but also improve the charge and discharge characteristics.

As an example of the lithium nickel composite oxide, a compound represented by Formula 27 below may be used.

$\text{Li}_a\text{Ni}_{1-b-c}\text{Co}_b\text{M}'_c\text{O}_2$     Formula 27

In Formula 27, $0.90 \leq a \leq 1.8$, $0 < b \leq 0.5$, $0 \leq c \leq 0.2$, and M' is Al, Mn, Cr, Fe, Mg, Sr, V, or a combination thereof.

Examples of the nickel rich lithium nickel composite oxide include $\text{LiNi}_{0.6}\text{Co}_{0.2}\text{Mn}_{0.2}\text{O}_2$, $\text{LiNi}_{0.5}\text{Co}_{0.2}\text{Mn}_{0.3}\text{O}_2$, $\text{LiNi}_{0.8}\text{Co}_{0.15}\text{Al}_{0.05}\text{O}_2$, and the like.

For example, the negative electrode of the lithium battery may include graphite. In addition, the lithium battery may have a high voltage of at least 4.35 V.

In an another example embodiment, the positive electrode of the lithium battery may include at least one active material selected from $\text{Li}_{(3-f)}\text{Fe}_2(\text{PO}_4)_3$ (where $0 \leq f \leq 2$) and $\text{LiFePO}_4$. Here, the lithium battery may include, as the electrolyte, the compound of Formula 5, the organic solvent, and the disultone-based compound of Formula 1.

For example, a lithium battery may be manufactured as follows.

First, a positive electrode is prepared as follows.

For example, a positive electrode active material, a conducting agent, a binder, and a solvent are mixed to prepare a positive electrode active material composition. A metal current collector is directly coated with the positive electrode active material composition, so as to prepare a positive electrode plate. Alternatively, the positive electrode active material composition may be cast on a separate support, and then, a film separated from the support may be laminated on the metal current collector, so as to prepare a positive electrode plate. A type or kind of the positive electrode is not limited to the example embodiments above, and instead may be embodied in various suitable forms.

The positive electrode active material used in the nickel rich lithium nickel composite oxide may improve the battery performance in terms of lifespan characteristics by reducing direct current internal resistance (DCIR) and gas production.

Any suitable lithium composite oxide available in the art may be used as the positive electrode active material. In addition, such a lithium composite oxide may be used together with the nickel rich lithium nickel composite oxide.

For example, the positive electrode active material may be at least one composite oxide of lithium and a metal selected from cobalt, manganese, nickel, and a combination thereof. For example, the positive electrode active material may be a compound represented by one of following formulae $\text{Li}_a\text{A}_{1-b}\text{B}_b\text{D}_2$ (where $0.90 \leq a \leq 1.8$ and $0 \leq b \leq 0.5$); $\text{Li}_a\text{E}_{1-b}\text{B}_b\text{O}_{2-c}\text{D}_c$ (where $0.90 \leq a \leq 1.8$, $0 \leq b \leq 0.5$, and $0 \leq c \leq 0.05$); $\text{LiE}_{2-b}\text{B}_b\text{O}_{4-c}\text{D}_c$ (where $0 \leq b \leq 0.5$ and $0 \leq c \leq 0.05$); $\text{Li}_a\text{Ni}_{1-b-c}\text{Co}_b\text{B}_c\text{D}_\alpha$ (where $0.90 \leq a \leq 1.8$, $0 \leq b \leq 0.5$, $0 \leq c \leq 0.05$, and $0 < \alpha \leq 2$); $\text{Li}_a\text{Ni}_{1-b-c}\text{Co}_b\text{B}_c\text{O}_{2-\alpha}\text{F}_\alpha$ (where $0.90 \leq a \leq 1.8$, $0 \leq b \leq 0.5$, $0 \leq c \leq 0.05$, and $0 < \alpha < 2$); $\text{Li}_a\text{Ni}_{1-b-c}\text{Co}_b\text{B}_c\text{O}_{2-\alpha}\text{F}_2$ (where $0.90 \leq a \leq 1.8$, $0 \leq b \leq 0.5$, $0 \leq c \leq 0.05$, and $0 < \alpha < 2$); $\text{Li}_a\text{Ni}_{1-b-c}\text{Mn}_b\text{B}_c\text{D}_\alpha$ (where $0.90 \leq a \leq 1.8$, $0 \leq b \leq 0.5$, $0 \leq c \leq 0.05$, and $0 < \alpha \leq 2$); $\text{Li}_a\text{Ni}_{1-b-c}\text{Mn}_b\text{B}_c\text{O}_{2-\alpha}\text{F}_2$ (where $0.90 \leq a \leq 1.8$, $0 \leq b \leq 0.5$, $0 \leq c \leq 0.05$, and $0 < \alpha < 2$); $\text{Li}_a\text{Ni}_{1-b-c}\text{Mn}_b\text{B}_c\text{O}_{2-\alpha}\text{F}_2$ (where $0.90 \leq a \leq 1.8$, $0 \leq b \leq 0.5$, $0 \leq c \leq 0.05$, and $0 < \alpha < 2$); $\text{Li}_a\text{Ni}_b\text{E}_c\text{G}_d\text{O}_2$ (where $0.90 \leq a \leq 1.8$, $0 \leq b \leq 0.9$, $0 \leq c \leq 0.5$, and $0.001 \leq d \leq 0.1$); $\text{Li}_a\text{Ni}_b\text{Co}_c\text{Mn}_d\text{G}_e\text{O}_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $\text{Li}_a\text{NiG}_b\text{O}_2$ (where $0.90 \leq a \leq 1.8$ and $0.001 \leq b \leq 0.1$); $\text{Li}_a\text{CoG}_b\text{O}_2$ (where $0.90 \leq a \leq 1.8$ and $0.001 \leq b \leq 0.1$); $\text{Li}_a\text{MnG}_b\text{O}_2$ (where $0.90 \leq a \leq 1.8$ and $0.001 \leq b \leq 0.1$); $\text{Li}_a\text{Mn}_2\text{G}_b\text{O}_4$ (where $0.90 \leq a \leq 1.8$ and $0.001 \leq b \leq 0.1$); $\text{QO}_2$; $\text{QS}_2$; $\text{LiQS}_2$; $\text{V}_2\text{O}_5$; $\text{LiV}_2\text{O}_5$; $\text{LiIO}_2$; $\text{LiNiVO}_4$; $\text{Li}_{(3-f)}\text{J}_2(\text{PO}_4)_3$ (where $0 \leq f \leq 2$); $\text{Li}_{(3-f)}\text{Fe}_2(\text{PO}_4)_3$ (where $0 \leq f \leq 2$); and $\text{LiFePO}_4$.

In the formulae above, A may be selected from the group consisting of nickel (Ni), cobalt (Co), manganese (Mn), and combinations thereof; B may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; may be selected from the group consisting of oxygen (O), fluorine (F), sulfur (S), phosphorus (P), and combinations thereof; E may be selected from the group consisting of cobalt (Co), manganese (Mn), and combinations thereof; F may be selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q may be selected from the group consisting of titanium (Ti), molybdenum (Mo), manganese (Mn), and combinations thereof; I may be selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof.

The compounds listed above as positive electrode active materials may have a coating layer on surfaces thereof. Alternatively, a mixture of a compound without a coating layer and a compound having a coating layer may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed by using any suitable method (e.g., a spray coating method, a dipping method, or the like) that does not adversely affect the physical properties of the positive electrode active material when a compound of the coating element is used. Such a method of forming the coating layer should be apparent to one of ordinary skill in the art, and thus, a detailed description thereof is not necessary here.

The conducting agent may be carbon black or graphite particulates, but the conducting agent is not limited thereto. Any suitable material available as a conducting agent in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but the binder is not limited thereto. Any suitable material available as a binder in the art may be used.

Examples of the solvent are N-methyl-pyrrolidone, acetone, and water. Any suitable material available as a solvent in the art may be used.

The amounts of the positive electrode active material, the conducting agent, the binder, and the solvent may be in ranges that are commonly used in lithium batteries. In some embodiments, at least one of the conducting agent, the binder and the solvent may not be used according to the use and the structure of the lithium battery.

Next, a negative electrode may be prepared.

For example, a negative electrode active material, a conducting agent, a binder, and a solvent are mixed to prepare a negative electrode active material composition. A metal current collector is directly coated with the negative electrode active material composition, so as to prepare a negative electrode plate. Alternatively, the negative electrode active material composition may be cast on a separate support, and then, a film separated from the support may be laminated on the metal current collector, so as to prepare a negative electrode plate.

The negative electrode active material may be any suitable negative electrode active material for a lithium battery available in the art. For example, the negative electrode active material may include at least one selected from the group consisting of lithium metal, a metal that is alloyable with lithium, a transition metal oxide, a non-transition metal oxide, and a carbonaceous material.

Examples of the metal alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Examples of the transition metal oxide are a lithium titanium oxide, a vanadium oxide, and a lithium vanadium oxide.

For example, the non-transition metal oxide may be $SnO_2$ and/or $SiO_x$ (where $0<x<2$).

Examples of the carbonaceous material are crystalline carbon, amorphous carbon, and mixtures thereof. Examples of the crystalline carbon are graphite, such as natural graphite or artificial graphite that are in amorphous, plate, flake, spherical, or fibrous form. Examples of the amorphous carbon are soft carbon (carbon sintered at low temperatures), hard carbon, meso-phase pitch carbides, and sintered cokes.

The conducting agent, the binder and the solvent used for the negative electrode active material composition may be the same or substantially the same as those described with respect to the positive electrode active material composition.

The amounts of the negative electrode active material, the conducting agent, the binder, and the solvent are those levels generally used in lithium batteries. In some embodiments, at least one of the conducting agent, the binder and the solvent may not be used according to the use and the structure of the lithium battery.

Next, a separator to be disposed between the positive electrode and the negative electrode may be prepared.

The separator for the lithium battery may be any suitable separator generally available for a lithium battery. The separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any suitable material generally available as a binder for an electrode plate. Examples of the polymer resin include a vinylidenefluoride/hexafluoropropylene copolymer, polyvinylidene fluoride (PVDF), polyacrylonitrile, polymethylmethacrylate and a mixture thereof.

Next, an electrolyte as described in the previous embodiments may be prepared as follows.

Figure 5:
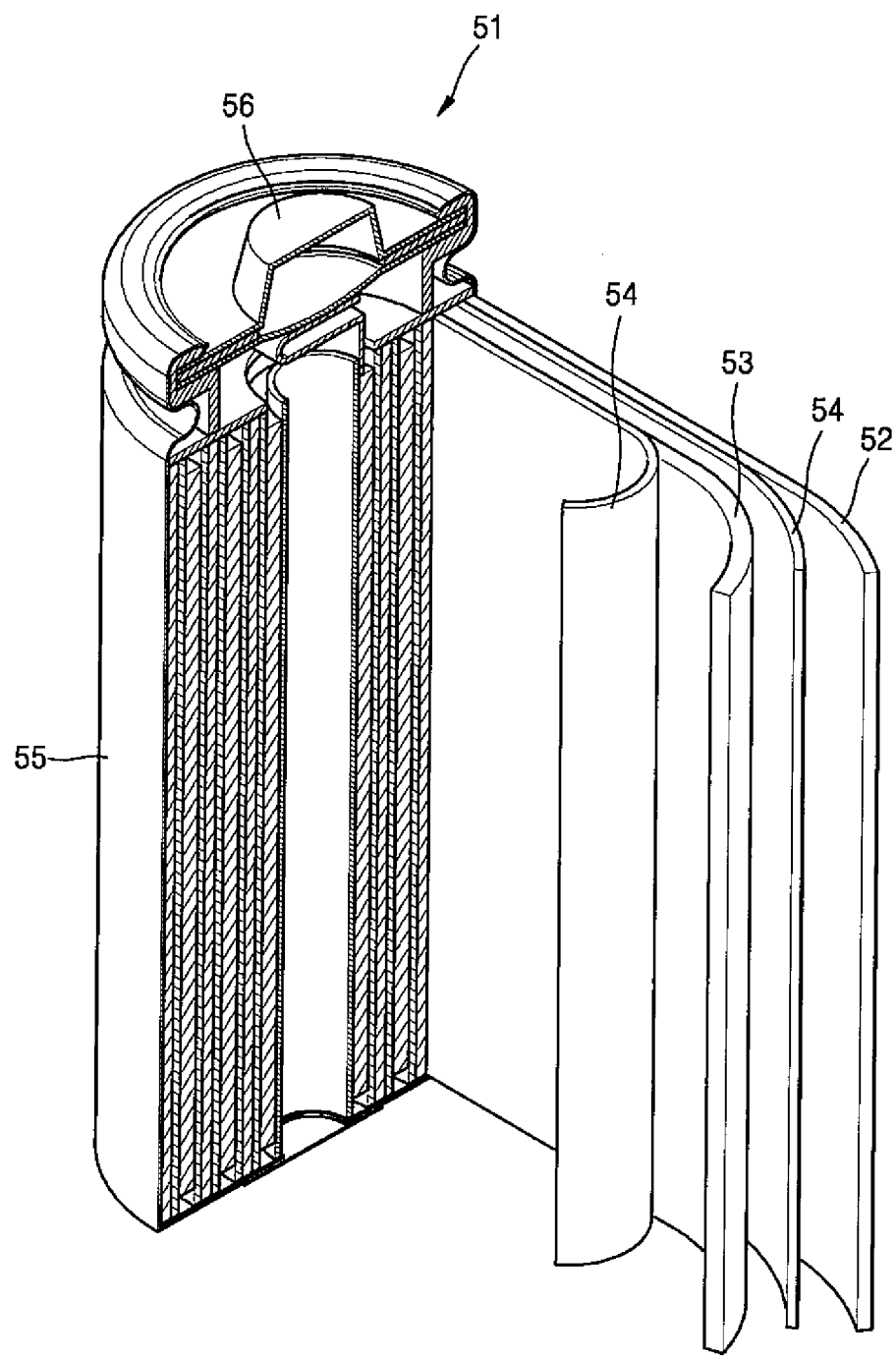
FIG. 5 is a schematic view of a lithium battery according to an example embodiment.

As shown in FIG. 5, a lithium battery 51 includes a positive electrode 53, a negative electrode 52, and a separator 54. The positive electrode 53, the negative electrode 52, and the separator 54 are wound or folded, and then accommodated in a battery case 55. Next, the battery case 55 is filled with an electrolyte, and then, sealed with a cap assembly 56, thereby completing manufacture of the lithium battery 51. The battery case 55 may be a cylindrical type (or kind), a rectangular type (or kind), or a thin-film type (or kind). For example, the lithium battery 51 may be a large thin-film type (or kind) lithium battery or a lithium ion battery.

The separator 54 may be disposed between the positive electrode 53 and the negative electrode 52, so as to form a battery assembly. Alternatively, the battery assembly may be stacked in a bi-cell structure and impregnated with the electrolytic solution. The resultant is put into a pouch and hermetically sealed, thereby completing the manufacture of a lithium ion polymer battery.

In addition, a plurality of the battery assemblies may be stacked to form a battery pack, and such a battery pack may be used in any suitable device that operates at high temperatures and requires high output, for example, in a laptop computer, a smart phone, and/or an electric vehicle.

The lithium battery may have improved lifetime characteristics and high rate characteristics, and thus, may be applicable to an electric vehicle (EV), for example, in a hybrid vehicle such as plug-in hybrid electric vehicle (PHEV). The lithium battery may be applicable to the high-power storage field, for example, in an electric bicycle or a power tool.

Hereinafter, one or more embodiments will be described in more detail with reference to the following examples. However, these examples are not intended to limit the scope of the one or more embodiments of the present disclosure.

Preparation Example 1: Synthesis of a Compound Represented by Formula 14 Below

A compound represented by Formula 14 was prepared according to Reaction Scheme 1 below.

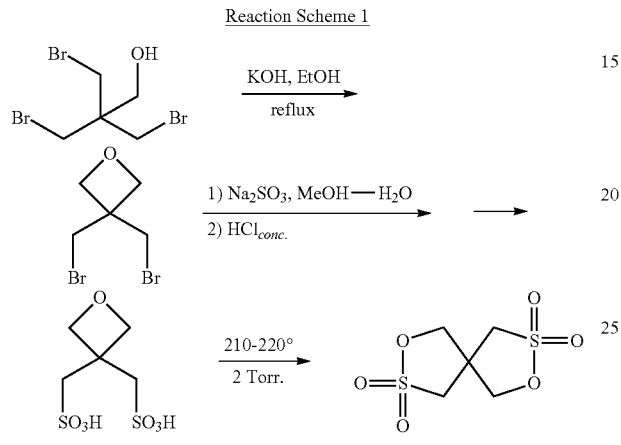

Compound of Formula 14

A solution in which 10.34 g (0.156 mole) of potassium hydroxide was dissolved in 200 ml of ethanol was dropwise added to a solution in which 50 g (0.154 mole) of pentaerythritol tribromide was dissolved in 200 ml of ethanol. The resulting mixture was refluxed for about 3 minutes. The resulting reaction product was cooled down to room temperature, and then filtered to remove KBr, followed by evaporating ethanol. The residue was distilled in vacuum to obtain 28 g (0.115 mole) of 3,3-bis(bromomethyl)oxacyclobutane (75%, b.p. 72-78° C. @ 10 mmHg).

1H NMR (400 MHz, CDCl3): δ 3.84 (s, 4H), 4.42 (s, 4H), 4.58 (s, 4H).

A solution in which 28 g (0.115 mole) of 3,3-bis(bromomethyl)oxacyclobutane was dissolved in a mixed solvent of 94 ml of methanol and 28 ml of water was dropwise added to a solution in which 44.8 g (0.358 mol) of $Na_2SO_3$ was dissolved in 252 ml of water. The resulting mixture was refluxed for about 3.5 hours, and then, the solvent was removed in vacuum. The residue was treated with 200 ml of concentrated hydrochloric acid (conc. HCl) at room temperature, and then, filtered to remove NaCl, thereby obtaining a sulfonic acid solution, which was then filtered in vacuum. The resulting residue oil was heated at about 2 mm Hg at about 210-220° C. for about 2 hours to obtain a black mass, which was then extracted with boiling dioxane and then filtered in a hot state. The filtrate was cooled down to crystallize.

Yield: 10 g (38%, m.p. 244-246° C.). 1H NMR (400 MHz, DMSO-d6): δ 3.87 (s, 2H), 3.88 (s, 2H), 4.58 (s, 4H).

Example 1: Preparation of Electrolyte 1 weight % of LiBOB represented by Formula 8 below and 1 weight % of the compound of Formula 14 of Preparation Example 1 were added to a mixed solvent of ethylenecarbonate (EC), ethylmethylcarbonate (EMC), and dimethylcarbonate (DMC) at a volume ratio of 2:4:4, so as to obtain an organic electrolyte, the weight % being based on the total weight of the electrolyte.

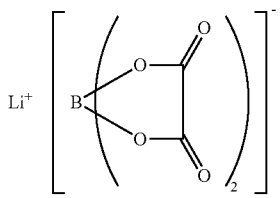

Formula 8

Example 2: Preparation of Electrolyte

An electrolyte was prepared according to the same manner as described with respect to Example 1, except that LiFOB represented by Formula 7 below was used instead of LiBOB.

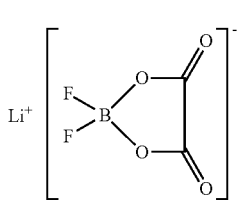

Formula 7

Example 3: Preparation of Electrolyte

An electrolytic solution was prepared according to the same manner as described with respect to Example 1, except that the amount of LiBOB was changed to 2 weight %, the weight % being based on the total weight of the electrolyte.

Examples 4 and 5: Preparation of Electrolyte

Electrolytes were prepared according to the same manner as described with respect to Example 1, except that 0.5 weight % of LiBOB and 3 weight % of LiBOB were used in Examples 4 and 5, respectively, instead of 1 weight % of LiBOB, the weight % being based on the total weight of the electrolyte.

Examples 6 and 7: Preparation of Electrolyte

Electrolytes were prepared according to the same manner as described with respect to Example 1, except that 0.5 weight % of LiFOB and 3 weight % of LiFOB were used in Examples 6 and 7, respectively, instead of 1 weight % of LiBOB, the weight % being based on the total weight of the electrolyte.

Comparative Example 1: Preparation of Electrolyte

An electrolytic solution was prepared according to the same manner as described with respect to Example 1, except that the additive, i.e., the compound of Formula 14, was not used.

Comparative Example 2: Preparation of Electrolyte

An organic electrolytic solution was prepared according to the same manner as described with respect to Example 1, except that 1 weight % of propane-sultone represented by Formula 26 below was added instead of the compound of Formula 14, the weight % being based on the total weight of the electrolyte.

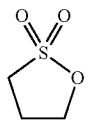

Formula 26

Comparative Example 3: Preparation of Electrolyte

An organic electrolytic solution was prepared according to the same manner as described with respect to Example 2, except that 1 weight % of propane-sultone of Formula 26 below was added instead of the compound of Formula 14, the weight % being based on the total weight of the electrolyte.

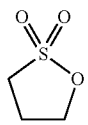

Formula 26

Manufacturing Example 1: Manufacture of Lithium Battery 98 weight % of artificial graphite (BSG-L, Tianjin BTR New Energy Technology Co., Ltd.), 1.0 weight % of styrene-butadiene rubber (SBR) binder (ZEON), and 1.0 weight % of carboxy methylcellulose (CMC) (NIPPON A&L) were mixed together, and then, added to distilled water. The mixture was stirred for 60 minutes by using a mechanical stirrer, so as to prepare a negative electrode active material slurry. A top surface of a copper current collector having a thickness of 10 μm was coated with the negative electrode active material slurry to a thickness of about 60 μm by using a doctor blade. The coated copper current collector was dried in vacuum for 0.5 hours by using a hot-air dryer at a temperature of 100° C., and then, dried again for 4 hours at a temperature of 120° C. The dried copper current collector was roll-pressed, so as to prepare a negative electrode.

97.45 weight % of a positive electrode active material, 0.5 weight % of an artificial graphite powder (SFG6, Timcal) as a conductive agent, 0.7 weight % of carbon black (Ketjenblack, ECP), 0.25 weight % of a reformed acrylonitrile rubber (BM-720H, Zeon Corporation), 0.9 weight % of poly(vinylidene fluoride) (PVdF) (S6020, Solvay), and 0.2 weight % of PVdF (S5130, Solvay) were added to an N-methyl-2-pyrrolidone solvent. The mixture was stirred for 30 minutes by using a mechanical stirrer, so as to prepare a positive electrode active material slurry.

As a positive electrode active material, a mixture of $LiNi_{0.6}Co_{0.2}Mn_{0.2}O_2$ and $LiNi_{0.8}Co_{0.15}Al_{0.05}O_2$ mixed at a weight ratio of 8:2 was used.

A top surface of an aluminum current collector having a thickness of 20 μm was coated with the positive electrode active material slurry to a thickness of about 60 μm by using a doctor blade. The coated aluminum current collector was dried in vacuum for 0.5 hours by using a hot-air dryer at a temperature of 100° C., and then, dried again for 4 hours at a temperature of 120° C. The dried aluminum current collector was roll-pressed, so as to prepare a positive electrode.

A polyethylene separator having a thickness of 14 μm in which the positive electrode is coated with ceramic was used as a separator, and the electrolyte of Example 1 was used as an electrolytic solution, so as to prepare a lithium battery.

Manufacturing Examples 2 to 7: Manufacture of Lithium Batteries

Lithium batteries were manufactured in the same manner as described with respect to Manufacturing Example 1, except that the electrolytes of Examples 2 to 7 were used, respectively, instead of the electrolyte of Example 1.

Comparative Manufacturing Examples 1 to 3: Manufacture of Lithium Batteries

Lithium batteries were manufactured in the same manner as described with respect to Manufacturing Example 1, except that the electrolytes of Comparative Examples 1 to 3 were used, respectively, instead of the electrolyte of Example 1.

Reference Manufacturing Example 1: Manufacture of Lithium Battery

A lithium battery was manufactured in the same manner as described with respect to Manufacturing Example 1, except that the positive electrode active material was $LiNi_{0.33}Co_{0.33}Mn_{0.33}O_2$ (hereinafter, referred to as "NCM111") instead of the mixture of $LiNi_{0.6}Co_{0.2}Mn_{0.2}O_2$ and $LiNi_{0.8}Co_{0.15}Al_{0.05}O_2$.

Reference Manufacturing Example 2: Manufacture of Lithium Battery

A lithium battery was manufactured in the same manner as described with respect to Manufacturing Example 2, except that the positive electrode active material was $LiNi_{0.33}Co_{0.33}Mn_{0.33}O_2$ (hereinafter, referred to as "NCM111") instead of the mixture of $LiNi_{0.6}Co_{0.2}Mn_{0.2}O_2$ and $LiNi_{0.8}Co_{0.15}Al_{0.05}O_2$.

Evaluation Example 1: Lifespan Characteristics at Room Temperature (25° C.)

1) Manufacturing Examples 1 and 2 and Comparative Examples 1 to 3

The lithium batteries of Manufacturing Examples 1 and 2 and Comparative Examples 1 to 3 were each charged at a constant current of 0.1 C rate at room temperature until a voltage of the lithium batteries reached 4.30 V (vs. Li), and then, the charging was cut-off at a current of 0.05 C rate while maintaining a constant voltage mode at 4.40 V, followed by discharging at a constant current of 0.1 C rate until a voltage of the lithium batteries reached 2.8 V (vs. Li) (formation process, 1st cycle).

Each of the lithium batteries through the 1$^{st}$ cycle of the formation process was charged at a constant current of 2.0 C rate until a voltage of the lithium batteries reached 4.30 V (vs. Li), and then, the charging was cut-off at a current of 0.05 C rate while maintaining a constant voltage mode at 4.30 V, followed by discharging at a constant current of 0.2 C rate until the voltage reached about 2.8 V (vs. Li) (formation process, $2^{nd}$ cycle).

Each of the lithium battery that underwent the $2^{nd}$ cycle of the formation process was charged at a constant current of 0.5 C rate until a voltage of the lithium batteries reached 4.30 V (vs. Li). Then, the lithium batteries maintained a constant voltage thereof to 4.30 V, and then, the charging was cut-off at a current of 0.05 C rate while maintaining a constant voltage mode at 4.3 V, followed by discharging at a constant current of 1.0 C rate until the voltage reached about 2.75 V (vs. Li). This cycle of charging and discharging was repeated 300 times.

A rest time of about 20 minutes was allowed after each charge and discharge cycle throughout the 300 charge and discharge cycles.

Some of the charge-discharge test results are shown in FIG. 1. Here, a capacity retention rate at the $300^{th}$ cycle may be defined by using Equation 1 below:

Capacity retention rate=[Discharge capacity at $300^{th}$ cycle/Discharge capacity at $1^{st}$ cycle]×100  Equation 1

As shown in FIG. 1, the lithium batteries of Manufacturing Examples 1 and 2 had improved discharge capacities and lifespan characteristics at room temperature as compared to discharge capacities and lifespan characteristics of the lithium battery of Comparative Manufacturing Example 1 and the lithium batteries of Comparative Manufacturing Examples 2 and 3 that included a typical additive.

2) Manufacturing Examples 1 and 2 and Reference Manufacturing Examples 1 and 2

The discharge capacities and lifespan characteristics of the lithium batteries of Manufacturing Examples 1 and 2 and Reference Manufacturing Examples 1 and 2 were evaluated at room temperature in the same manner as described with respect to the discharge capacities and lifespan characteristics of the lithium batteries prepared according to Manufacturing Examples 1 and 2 Comparative Manufacturing Examples 1 to 3 evaluated at room temperature.

As a result, the lithium batteries prepared according to Reference Manufacturing Examples 1 and 2 using NCM 111 as a positive electrode active material in a positive electrode were found to have a lifespan equal to about 98% the lifespan of the lithium batteries prepared according to Manufacturing Examples 1 and 2 evaluated at room temperature. In addition, the lithium batteries prepared according to Manufacturing Examples 1 and 2 were found to have improved discharge capacities as compared to those of the lithium batteries of Reference Manufacturing Examples 1 and 2. Accordingly, it was confirmed that the lithium batteries of Manufacturing Examples 1 and 2 used a positive electrode including a nickel-rich positive electrode active material, and thus, had excellent discharge capacities and lifespan characteristics at room temperature.

Evaluation Example 2: Lifespan Characteristics at a High Temperature (45° C.)

1) Manufacturing Examples 1 and 2 and Comparative Manufacturing Examples 1 to 3

The lithium batteries of Manufacturing Examples 1 and 2 and Comparative Manufacturing Examples 1 to 3 were each subjected to evaluation of lifespan characteristics at a high temperature in the same manner as described with respect to Evaluation Example 1, i.e., the evaluation of the lifespan characteristics of the lithium batteries prepared according to Manufacturing Examples 1 and 2 and Comparative Manufacturing Examples 1 to 3 evaluated at room temperature, except that the charge and discharge cycle was performed at a temperature of 45° C. and the charge and discharge cycle including discharging the lithium batteries at a constant current of 1.0 C rate until a voltage of the lithium batteries reached 2.75 V (vs. Li) was repeated 400 times.

Every charge and discharge cycle was repeated after a 20 minute pause, up until the 400th charge and discharge cycle.

Figure 2:
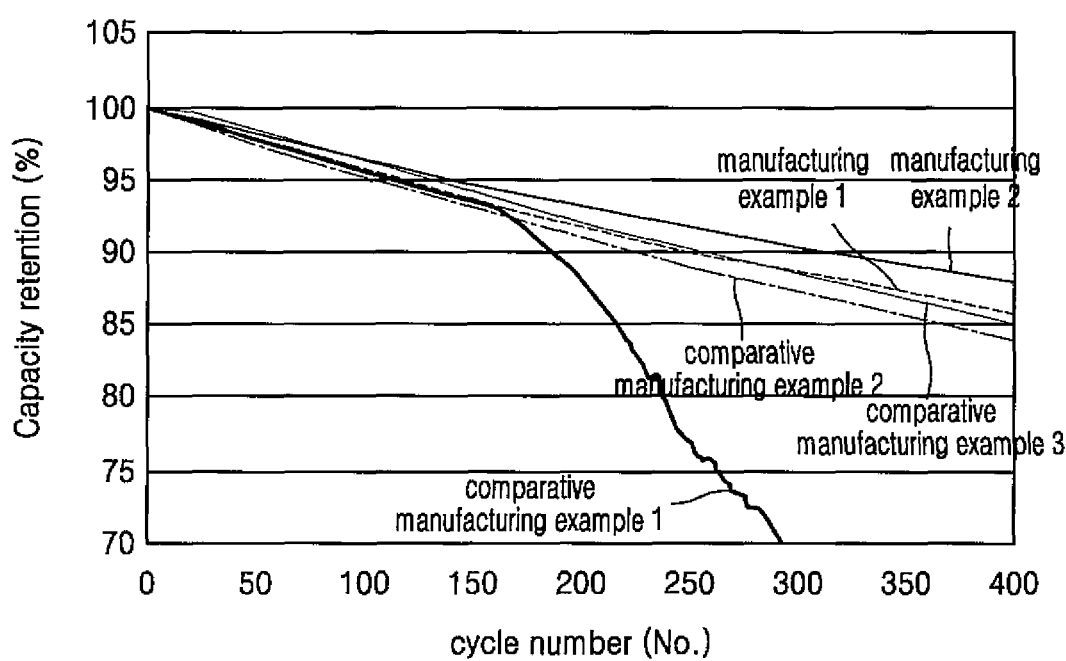
FIG. 2 is a graph showing lifespan characteristics of lithium batteries prepared according to Manufacturing Examples 1 to 2 and Comparative Manufacturing Examples 1 to 3 at a high temperature (45° C.)

Some of the charge-discharge test results are shown in FIG. 2.

As shown in FIG. 2, discharge capacities and lifespan characteristics evaluated at a high temperature improved significantly in the lithium batteries prepared according to Manufacturing Examples 1 and 2 as compared to those of the lithium batteries prepared according to Comparative Manufacturing Examples 1 to 3 without including an additive.

1) Manufacturing Examples 1 and 2 and Reference Manufacturing Examples 1 and 2

The discharge capacities and lifespan characteristics of the lithium batteries of Reference Manufacturing Examples 1 and 2 were evaluated at room temperature in the same manner as described with respect to the discharge capacities and lifespan characteristics of the lithium batteries of Manufacturing Examples 1 and 2 Comparative Manufacturing Examples 1 to 3 evaluated at a high temperature.

As a result, the lithium batteries prepared according to Reference Manufacturing Examples 1 and 2 using NCM 111 as a positive electrode active material in a positive electrode were found to have lifespan characteristics at a level of about 97% of the lifespan characteristics of the lithium batteries prepared according to Manufacturing Examples 1 and 2 evaluated at a high temperature (45° C.). In addition, the lithium batteries of Manufacturing Examples 1 and 2 were found to have improved discharge capacities as compared to those of the lithium batteries of Reference Manufacturing Examples 1 and 2. Accordingly, it was confirmed that the lithium batteries of Manufacturing Examples 1 and 2 used a positive electrode including a nickel-rich positive electrode active material, and thus, had excellent discharge capacities and lifespan characteristics at a high temperature.

Evaluation Example 3: Lifespan Characteristics at a High Temperature (60° C.)

The lithium batteries prepared according to Manufacturing Examples 1 to 3 and Comparative Manufacturing Examples 1 to 3 were charged at a constant current of 1 C rate at a temperature of 25° C. until a voltage of the lithium batteries reached 4.30 V (vs. Li). The lithium batteries maintained a constant voltage thereof to 4.40 V, and the constant voltage was cut-off at a current of 0.05 C rate. Next, the lithium batteries were discharged at a constant current of 0.1 C rate until a voltage of the lithium batteries reached 2.8V (vs. Li) ($1^{st}$ cycle in formation process).

The lithium batteries subjected to the $1^{st}$ cycle in the formation process were charged at a constant current of 0.2 C rate at a temperature of 25° C. until a voltage of the lithium batteries reached 4.30 V (vs. Li). Then, the lithium batteries maintained a constant voltage thereof to 4.30 V, and the constant voltage was cut-off at a current of 0.05 C rate. Next, the lithium batteries were discharged at a constant current of 0.2 C rate until a voltage of the lithium batteries reached 2.8 V (vs. Li) ($2^{nd}$ cycle in formation process).

The lithium batteries subjected to the 2nd cycle in the formation process were charged at a constant current of 1.0 C rate at a temperature of 25° C. until a voltage of the lithium batteries reached 4.30 V (vs. Li). Then, the lithium batteries maintained a constant voltage thereof to 4.30 V, and the constant voltage was cut-off at a current of 0.05 C rate. Accordingly, the lithium batteries were full-charged with 4.3 V at 100% state of charge (SOC).

The charged lithium batteries were stored in an oven at a temperature of 60° C. for 10 days and 30 days. After taking out the lithium batteries from the oven, the charge and discharge cycle including discharging the lithium batteries at a 0.1 C rate until a voltage of the lithium batteries reached 2.8 V was repeated 4 times.

Figure 3:
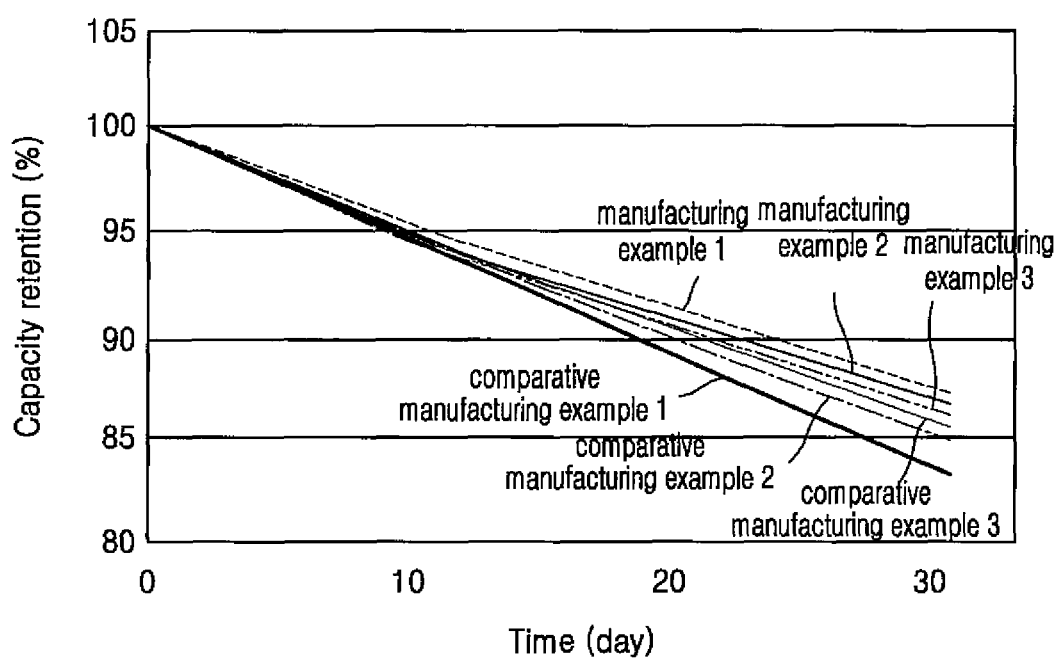
FIG. 3 is a graph showing lifespan characteristics of lithium batteries prepared according to Manufacturing Examples 1 to 3 and Comparative Manufacturing Examples 1 to 3 at a high temperature (60° C.)

Some of the charge-discharge test results are shown in FIG. 3 and Table 1 below.

Here, a capacity retention rate after being preserved at a high temperature may be defined using Equation 2 below:

Capacity retention rate [%]=[Discharge capacity after 10 days/Initial discharge capacity before being preserved at a high temperature]×100            Equation 2

TABLE 1

| Division | Capacity (mAh) | | | Capacity change rate (%) | | |
|---|---|---|---|---|---|---|
| | Initial | 10 D | 30 D | Initial | 10 D | 30 D |
| Manufacturing Example 1 | 295.860 | 281.56 | 258.11 | 100 | 95.17 | 87.24 |
| Manufacturing Example 2 | 296.378 | 279.90 | 257.00 | 100 | 94.68 | 86.71 |
| Manufacturing Example 3 | 298.601 | 282.08 | 257.12 | 100 | 94.47 | 85.91 |
| Comparative Manufacturing Example 1 | 299.626 | 283.20 | 250.11 | 100 | 94.52 | 83.47 |
| Comparative Manufacturing Example 2 | 297.919 | 282.13 | 256.25 | 100 | 94.71 | 85.01 |
| Comparative Manufacturing Example 3 | 298.901 | 283.00 | 255.95 | 100 | 94.68 | 85.63 |

As shown in Table 1 and FIG. 3, it was confirmed that the capacity change rate values of lithium batteries of Manufacturing Examples 1 to 3 were small as compared to those of the lithium batteries of Comparative Manufacturing Examples 1 to 3 that did not include an additive, and thus, the capacity of lithium batteries prepared of Manufacturing Examples 1 to 3 was reduced at a high temperature.

Evaluation Example 4: Direct-Current Internal Resistance (DC-IR) after Preserving at High-Temperature (60° C.)

Among the lithium batteries prepared according to Manufacturing Examples 1 to 3 and Comparative Manufacturing Examples 1 to 3, those lithium batteries that were not subjected to the oven at a temperature of 60° C. and those that remained in the oven at a temperature of 60° C. for 10 days and 30 days were subjected to a direct current internal resistance (DC-IR) measurement at room temperature (25° C.) by using the following method.

In the 1st cycle, each of the batteries was charged at a current of 0.5 C until a voltage that is 50% of a state of charge (SOC), cut-off at a current of 0.02 C, and rested for 10 minutes, discharged at a constant current of 0.5 C for 30 seconds, rested for 30 seconds, charged at a constant current of 0.5 C for 30 seconds, and rested for 10 minutes, discharged at a constant current of 1.0 C for 30 seconds, rested for 30 seconds, charged at a constant current of 0.5 C for 1 minute, and rested for 10 minutes, discharged at a constant current of 2.0 C for 30 seconds, rested for 30 seconds, charged at a constant current of 0.5 C for 2 minutes, and rested for 10 minutes, and discharged at a constant current of 3.0 C for 30 seconds, rested for 30 seconds, charged at a constant current of 0.5 C for 2 minutes, and rested for 10 minutes.

Here, an average voltage decrease value for 30 seconds per C-rate of each of the batteries is a direct-current voltage value.

Figure 4:
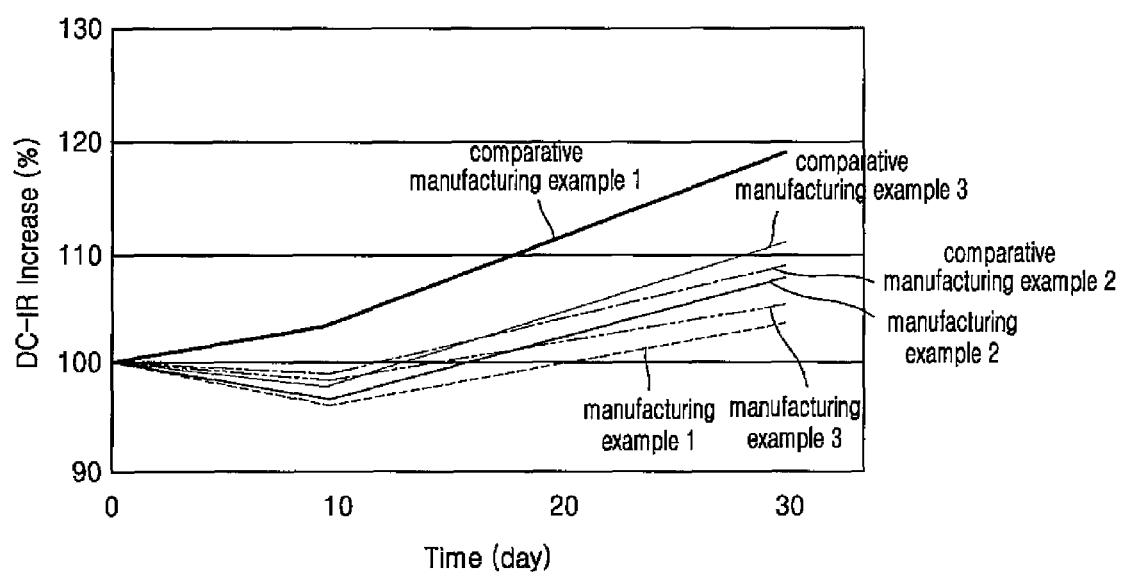
FIG. 4 is a graph showing direct current resistances (DC-IRs) of lithium batteries prepared according to Manufacturing Examples 1 to 3 and Comparative Manufacturing Examples 1 to 3 after preserving the lithium batteries at a high temperature (60° C.)

Some of the DC-IR measurement are shown in FIG. 4 and Table 2.

Here, direct current resistance increase rates calculated from the initial discharge capacities and direct current resistances after preserving at high temperature are defined by using Equation 3 below.

Direct current resistance increase rate=[Direct current resistance after preserving at high temperature/initial direct current resistance]×100            Equation 3

TABLE 2

| Division | Resistance (mΩ) | | | Direct current resistance increase rate (%) | | |
|---|---|---|---|---|---|---|
| | Initial | 10 D | 30 D | Initial | 10 D | 30 D |
| Manufacturing Example 1 | 254.283 | 245.009 | 262.731 | 100% | 96.35% | 103.32% |
| Manufacturing Example 2 | 244.298 | 235.808 | 261.418 | 100% | 96.52% | 107.01% |
| Manufacturing Example 3 | 258.414 | 253.589 | 270.703 | 100% | 98.13% | 104.76% |
| Comparative Manufacturing Example 1 | 242.507 | 250.765 | 287.066 | 100% | 103.41% | 118.37% |
| Comparative Manufacturing Example 2 | 252.499 | 249.713 | 273.326 | 100% | 98.90% | 108.25% |
| Comparative Manufacturing Example 3 | 245.781 | 240.271 | 270.223 | 100% | 97.76% | 109.94% |

In Table 2, 10D and 30D each refer to 10-day storage and 30-day storage.

Referring to Table 2 and FIG. 4, direct current resistance increase rates after preserving at high temperature of the lithium batteries of Manufacturing Examples 1 to 3 were decreased as compared to those of the lithium batteries of Comparative Manufacturing Examples 1 to 3 that did not include an additive.

As described above, according to one or more of the above embodiments, when a lithium battery includes an electrolyte, direct current internal resistances (DC-IRs) and gas production amounts are reduced, thereby obtaining a lithium battery having improved lifespan characteristics.

It should be understood that the example embodiments described herein should be considered in a descriptive sense only and not for purposes of limitation. Descriptions of features or aspects within each example embodiment should be considered as being available for other similar features or aspects in other example embodiments.

While one or more example embodiments have been described with reference to the drawings, it will be understood by those of ordinary skill in the art that various changes in form and details may be made therein without departing from the spirit and scope of the present disclosure as defined in the following claims, and equivalents thereof.

What is claimed is:

1. An electrolyte for a lithium battery, comprising:
  a disultone-based compound represented by Formula 1;
  an oxalate-based compound comprising at least one selected from a compound represented by Formula 2 and a compound represented by Formula 3; and
  an organic solvent:

Formula 1

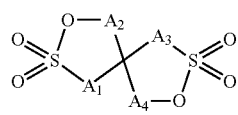

wherein, in Formula 1, $A_1$, $A_2$, $A_3$, and $A_4$ are each independently a substituent-substituted or unsubstituted $C_1$-$C_5$ alkylene group, a carbonyl group, or a sulfinyl group, Formula 2

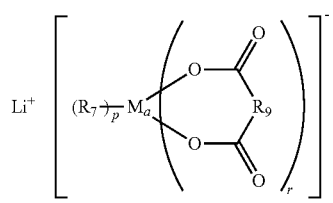

Formula 3

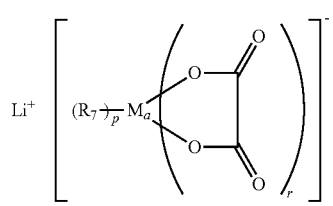

wherein, in Formulae 2 and 3,
$M_a$ is aluminum (Al), boron (B), or phosphorus (P),
p is an integer selected from 0 to 8,
r is an integer selected from 1 to 4,
$R_7$ is a halogen, and
$R_9$ is an unsubstituted $C_1$-$C_5$ alkylene group or a $C_1$-$C_5$ alkylene group substituted with a halogen.

2. The electrolyte of claim 1, wherein the oxalate-based compound is selected from compounds respectively represented by Formulae 4 to 9:

Formula 4

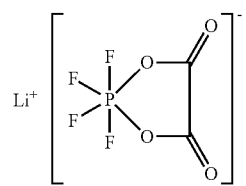

Formula 5

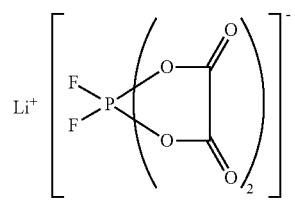

Formula 6

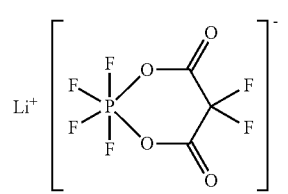

Formula 7

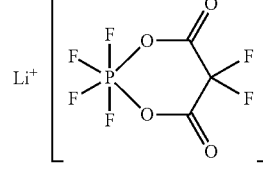

Formula 8

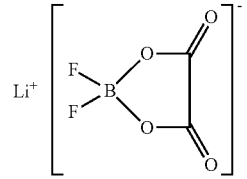

Formula 9

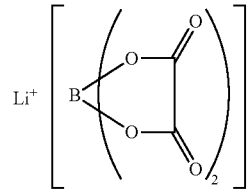

3. The electrolyte of claim 1, further comprising the oxalate-based compound in an amount in a range of about 0.5 to about 3 weight % based on the total weight of the electrolyte.

4. The electrolyte of claim 1, wherein an amount of the disultone-based compound is in a range of about 0.01 to about 10 weight % based on a total amount of the electrolyte.

5. The electrolyte of claim 1, wherein the organic solvent is at least one selected from dialkylcarbonate, cyclic carbonate, linear or cyclic ester, linear or cyclic amide, aliphatic nitrile, linear or cyclic ether, and a derivative thereof.

6. The electrolyte of claim 1, wherein the organic solvent is at least one selected from dimethyl carbonate (DMC), ethylmethyl carbonate (EMC), methylpropyl carbonate, ethylpropyl carbonate, diethyl carbonate (DEC), dipropyl carbonate, propylene carbonate (PC), ethylene carbonate (EC), fluoroethylene carbonate (FEC), butylene carbonate, ethylpropionate, ethyl butyrate, acetonitrile, succinonitrile (SN), dimethylsulfoxide, dimethylformamide, dimethylacetamide, gamma-valerolactone, gamma-butyrolactone, and tetrahydrofuran.

7. The electrolyte of claim 1, wherein at least one selected from $A_1$-$A_4$ is a substituted $C_1$-$C_5$ alkylene group, and the substituent is a halogen-substituted or unsubstituted $C_1$-$C_{20}$ alkyl group; a halogen-substituted or unsubstituted $C_2$-$C_{20}$ alkenyl group; a halogen-substituted or unsubstituted $C_2$-$C_{20}$ alkynyl group; a halogen-substituted or unsubstituted $C_3$-$C_{20}$ cycloalkenyl group; a halogen-substituted or unsubstituted $C_3$-$C_{20}$ heterocycloalkenyl group; a halogen-substituted or unsubstituted $C_6$-$C_{40}$ aryl group; a halogen-substituted or unsubstituted $C_2$-$C_{40}$ heteroaryl group; or a heteroatom-containing polar functional group.

8. The electrolyte of claim 7, wherein the heteroatom-containing polar functional group is at least one selected from —F, —Cl, —Br, —I, —C(=O)OR$^{16}$, —OC(=O)R$^{16}$, —OR$^{16}$, —OC(=O)OR$^{16}$, —R$^{15}$OC(=O)OR$^{16}$, —C(=O)R$^{16}$, —R$^{15}$C(=O)R$^{16}$, —OC(=O)R$^{16}$, —R$^{15}$OC(=O)R$^{16}$, —(R$^{15}$O)$_k$—OR$^{16}$, —(OR$^{15}$)$_k$—OR$^{16}$, —C(=O)—O—C(=O)R$^{16}$, —R$^{15}$C(=O)—O—C(=O)R$^{16}$, —SR$^{16}$, —R$^{15}$SR$^{16}$, —SSR$^{16}$, —R$^{15}$SSR$^{16}$, —S(=O)R$^{16}$, —R$^{15}$S(=O)R$^{16}$, —R$^{15}$C(=S)R$^{16}$, —R$^{15}$C(=S)SR$^{16}$, —R$^{15}$SO$_3$R$^{16}$, —SO$_3$R$^{16}$, —NNC(=S)R$^{16}$, —R$^{15}$NNC(=S)R$^{16}$, —R$^{15}$N=C=S, —NCO, —R$^{15}$—NCO, —NO$_2$, —R$^{15}$NO$_2$, —R$^{15}$SO$_2$R$^{16}$, —SO$_2$R$^{16}$,

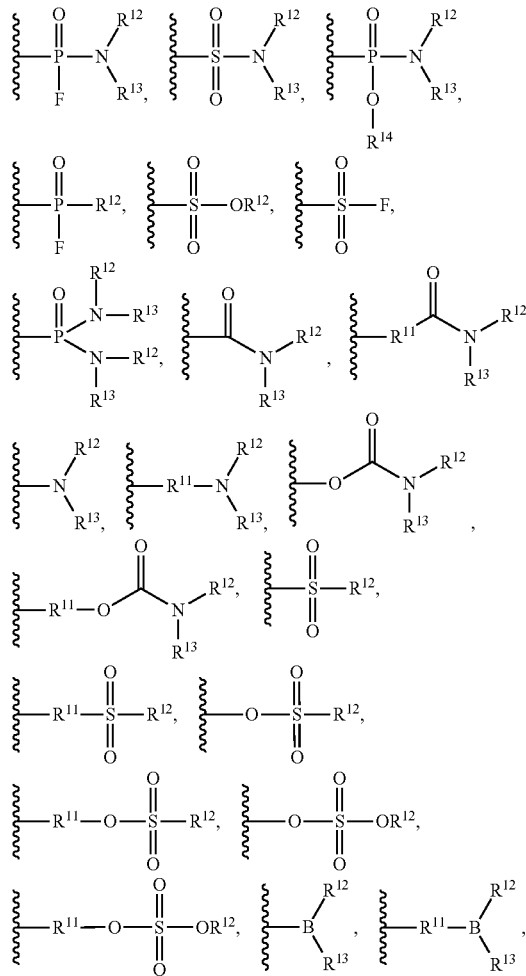

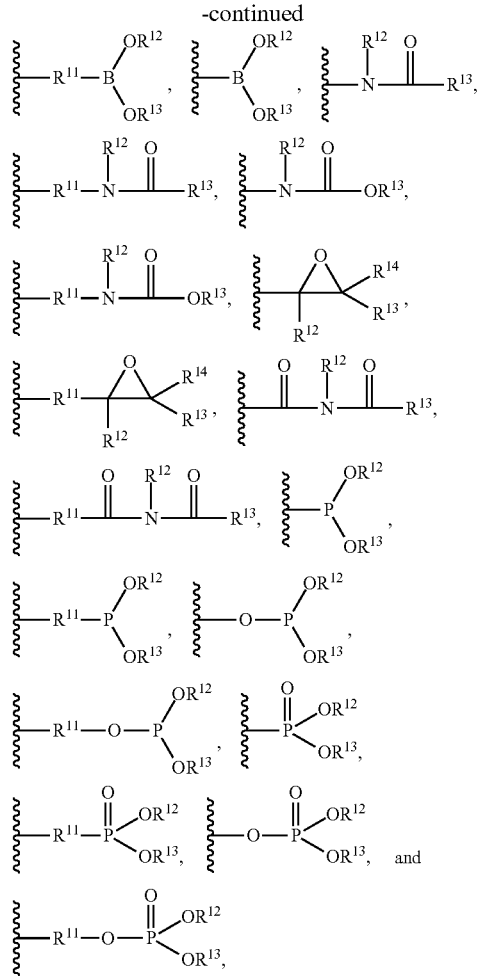

wherein R$^{11}$ and R$^{15}$ are each independently a halogen-substituted or unsubstituted $C_1$-$C_{20}$ alkylene group; a halogen-substituted or unsubstituted $C_2$-$C_{20}$ alkenylene group; a halogen-substituted or unsubstituted $C_2$-$C_{20}$ alkynylene group; a halogen-substituted or unsubstituted $C_3$-$C_{12}$ cycloalkylene group; a halogen-substituted or unsubstituted $C_6$-$C_{40}$ arylene group; a halogen-substituted or unsubstituted $C_2$-$C_{40}$ heteroarylene group; a halogen-substituted or unsubstituted $C_7$-$C_{15}$ alkylarylene group; or a halogen-substituted or unsubstituted $C_7$-$C_{15}$ aralkylene group, R$^{12}$, R$^{13}$, R$^{14}$, and R$^{16}$ are each independently a hydrogen atom; a halogen atom; a halogen-substituted or unsubstituted $C_1$-$C_{20}$ alkyl group; a halogen-substituted or unsubstituted $C_2$-$C_{20}$ alkenyl group; a halogen-substituted or unsubstituted $C_2$-$C_{20}$ alkynyl group; a halogen-substituted or unsubstituted $C_3$-$C_{12}$ cycloalkyl group; a halogen-substituted or unsubstituted $C_6$-$C_{40}$ aryl group; a halogen-substituted or unsubstituted $C_2$-$C_{40}$ heteroaryl group; a halogen-substituted or unsubstituted $C_7$-$C_{15}$ alkylaryl group; a halogen-substituted or unsubstituted $C_7$-$C_{15}$ trialkylsilyl group; or a halogen-substituted or unsubstituted $C_7$-$C_{15}$ aralkyl group, and k is an integer selected from 1 to 20.

9. The electrolyte of claim 1, wherein the disultone-based compound is represented by Formulae 10 or 11:

Formula 10

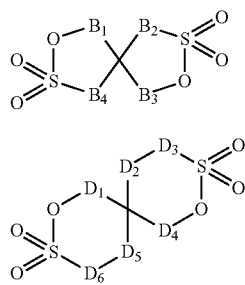

Formula 11 wherein, in Formulae 10 and 11, $B_1$, $B_2$, $B_3$, $B_4$, $D_1$, $D_2$, $D_3$, $D_4$, $D_5$, and $D_6$ are each independently —C($E_1$)($E_2$)-; a carbonyl group; or a sulfinyl group, and $E_1$ and $E_2$ are each independently a hydrogen atom; a halogen atom; a halogen-substituted or unsubstituted $C_1$-$C_{20}$ alkyl group; a halogen-substituted or unsubstituted $C_2$-$C_{20}$ alkenyl group; a halogen-substituted or unsubstituted $C_2$-$C_{20}$ alkynyl group; a halogen-substituted or unsubstituted $C_3$-$C_{20}$ cycloalkenyl group; a halogen-substituted or unsubstituted $C_3$-$C_{20}$ heterocycloaryl group; a halogen-substituted or unsubstituted $C_6$-$C_{40}$ aryl group; or a halogen-substituted or unsubstituted $C_2$-$C_{40}$ heteroaryl group.

10. The electrolyte of claim 1, wherein the disultone-based compound is represented by Formulae 12 or 13:

Formula 12

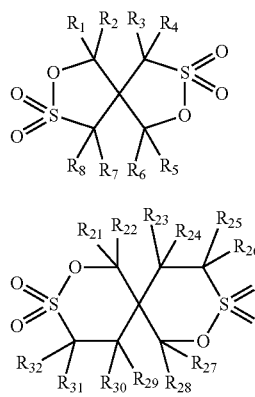

Formula 13 wherein in Formulae 12 and 13, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently a hydrogen atom; a halogen atom; a halogen-substituted or unsubstituted $C_1$-$C_{20}$ alkyl group; a halogen-substituted or unsubstituted $C_6$-$C_{40}$ aryl group; or a halogen-substituted or unsubstituted $C_2$-$C_{40}$ heteroaryl group.

11. The electrolyte of claim 1, wherein the disultone-based compound comprises a compound represented by Formulae 14 to 25:

Formula 14

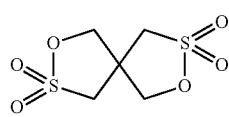

Formula 15

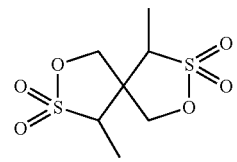

Formula 16

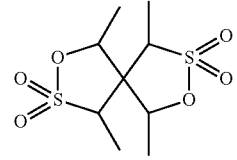

Formula 17

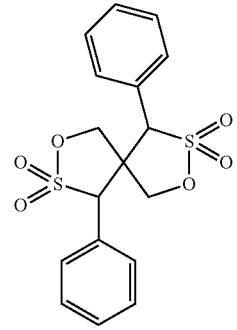

Formula 18

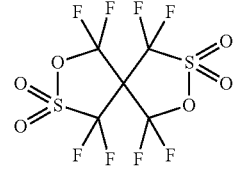

Formula 19

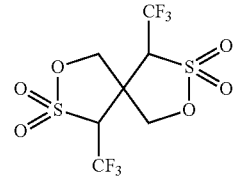

Formula 20

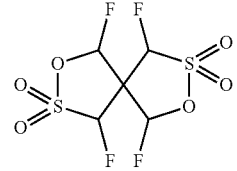

Formula 21

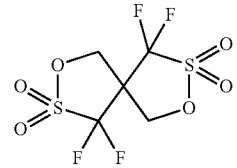

-continued

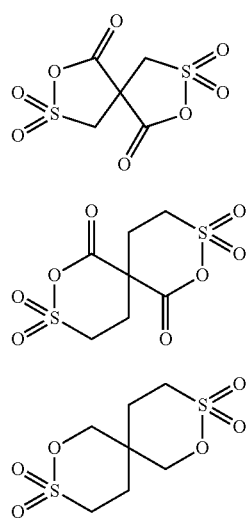

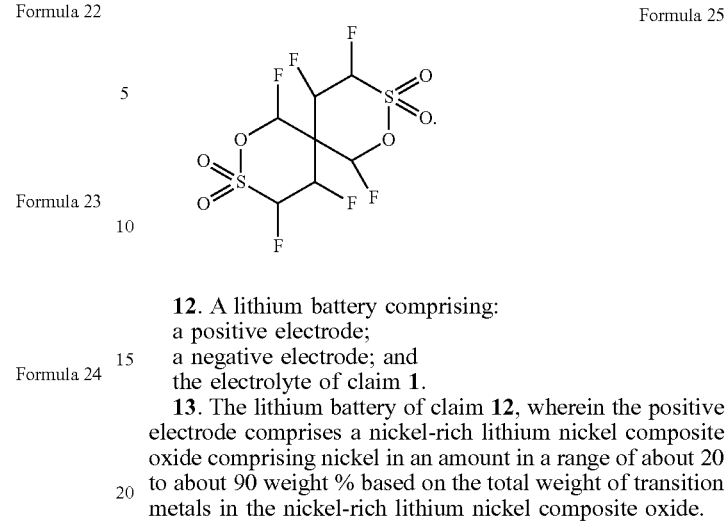

Formula 22

Formula 23

Formula 24

Formula 25

12. A lithium battery comprising:
a positive electrode;
a negative electrode; and
the electrolyte of claim 1.
13. The lithium battery of claim 12, wherein the positive electrode comprises a nickel-rich lithium nickel composite oxide comprising nickel in an amount in a range of about 20 to about 90 weight % based on the total weight of transition metals in the nickel-rich lithium nickel composite oxide.

* * * * *